United States Patent
Yamakaji et al.

(10) Patent No.: US 6,637,880 B1
(45) Date of Patent: Oct. 28, 2003

(54) SPECTACLE LENS AND MANUFACTURING METHOD THEREFOR

(75) Inventors: Tetsuma Yamakaji, Tokyo (JP); Takashi Hatanaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/701,738

(22) PCT Filed: Feb. 10, 2000

(86) PCT No.: PCT/JP00/00763

§ 371 (c)(1), (2), (4) Date: Dec. 4, 2000

(87) PCT Pub. No.: WO00/48035

PCT Pub. Date: Aug. 17, 2000

(30) Foreign Application Priority Data

Feb. 12, 1999 (JP) ............................................. 11-035017

(51) Int. Cl.[7] .............................. G02C 7/02; G02C 7/06
(52) U.S. Cl. ........................ 351/177; 351/159; 351/168; 351/169; 351/176
(58) Field of Search ................................ 351/159, 176, 351/177, 168, 169

(56) References Cited

U.S. PATENT DOCUMENTS

| 3,434,781 A | 3/1969 | Davis et al. | 351/176 |
| 3,960,442 A | 6/1976 | Davis et al. | 351/176 |
| 4,310,225 A | 1/1982 | Davis | 351/176 |
| 5,926,247 A | 7/1999 | Kimura | 351/41 |

FOREIGN PATENT DOCUMENTS

| EP | 0 576 268 A1 | 12/1993 |
| EP | 0 710 526 A1 | 5/1996 |
| EP | 0 851 265 A2 | 7/1998 |
| EP | 0 865 871 A2 | 9/1998 |
| JP | 52-115242 | 9/1977 |
| JP | 58-24112 | 2/1983 |
| JP | 59-55411 | 3/1984 |
| JP | 64-40926 | 2/1989 |
| JP | 6-17853 | 1/1994 |
| JP | 6-18823 | 1/1994 |
| JP | 6-34923 | 2/1994 |
| JP | 10-186293 | 7/1998 |
| WO | WO 85/02689 | 6/1985 |
| WO | WO 97/26578 | 7/1997 |
| WO | WO 98/16862 | 4/1998 |

OTHER PUBLICATIONS

Schikorra, Alfred; Einstarken–und Mehrstarken–Brillenglaser, Verlag der Deutschen Optikerzeitung; 1994; pp. 65–66.

Koji Ose, "Megane Kogaku", Oct. 5, 1988 Kyoritsu Shuppan (Tokyo), pp. 101–102.

G.A. Fry et al., "The Center of Rotation of the Eye", American Journal of Optometry and Archives of American Academy of Optometry; Vol 39, Nov. 1963, No. 11.

Primary Examiner—Scott J. Sugarman
(74) Attorney, Agent, or Firm—Oliff & Berridge, PLC

(57) ABSTRACT

An eyeglass having a prescription face optimized considering the individual wearing conditions, and a method for manufacturing the eyeglass. Information including the prescribed values including data relate to the VR value of each eyeglass wearer necessary to design and manufacture the eyeglass are transmitted through a terminal installed in an optician (on the orderer's side) to a host computer installed in an eyeglass manufacturer (on the manufacturer's side). The information is processed by the host computer to determine the eyeglass shape optimized on the basis of an optical model under simulated wearing conditions and to determine the manufacturing conditions. Thus, an eyeglass is manufactured by a numerical controlled machine and an edger and is delivered to the orderer's side.

9 Claims, 26 Drawing Sheets

FIG.2

ORDER PLACEMENT · INQUIRY SCREEN

| CUSTOMER No. | ****** | | | | | | |
|---|---|---|---|---|---|---|---|
| DATA OF FIRST VISIT: | 1998yearmonthday | | | | | | |
| NAME : | TARO HOYA | (MALE) | | (FEMALE) | | | |
| DISTANCE PD : | R: 32.5mm | NEAR PD : | R: — | | | | |
| | L: 31.5mm | | L: — | | | | |
| EYEPOINT HEIGHT: | R: +4.0mm | SEGMENT HEIGHT : | R: — | EDGE THICKNESS SPECIFICATION: | R: — | | |
| | L: +4.0mm | | L: — | | L: — | | |
| DISTANCE VR VALUE : | R: 29.6mm | CO VALUE=27.0mm | CR VALUE=14.6mm | VC VALUE=15.0mm | | | |
| | L: 28.8mm | CO VALUE=25.5mm | CR VALUE=13.8mm | VC VALUE=15.0mm | | | |
| NEAR VR VALUE : | R: 29.0mm | CO VALUE=26.0mm | CR VALUE=14.0mm | VC VALUE=15.0mm | | | |
| | L: 28.2mm | CO VALUE=24.5mm | CR VALUE=13.2mm | VC VALUE=15.0mm | | | |

LENS DATA

| INDIVIDUALLY-DESIGNED LENS NAME : | SPRX-W |
|---|---|

FRAME DATA

| MAKER NAME | |
|---|---|
| TYPE | |
| FRAME FORWARD TILT | |

POWER DATA

| | SPH | CYL | AX | ADD | PROCESSING SPECIFICATION | | | |
|---|---|---|---|---|---|---|---|---|
| R | +3.75 | +1.50 | 70 | 2.25 | P2.00IN | | | |
| L | +3.25 | — | — | 2.25 | P2.00IN | | | |

FIG.5

OPTICAL DATA OF PRESCRIPTION LENS WITH VR VALUE OF 27mm

| DISTANCE FROM OPTICAL CENTER (mm) | CONVEX SURFACE CURVE VALUE (DIOPTRE) | CONCAVE SURFACE CURVE VALUE (DIOPTRE) |
|---|---|---|
| 0.0 | 0.5 | 4.5 |
| 5.0 | 0.574 | 4.5 |
| 10.0 | 0.752 | 4.5 |
| 15.0 | 0.957 | 4.5 |
| 20.0 | 1.122 | 4.5 |
| 25.0 | 1.205 | 4.5 |
| 30.0 | 1.221 | 4.5 |
| 35.0 | 1.259 | 4.5 |

$$\left( \begin{array}{l} \text{POWER}: -4.00\,(\text{DIOPTRE}) \\ \text{REFRACTIVE INDEX}\,(nd)\,;\,1.50 \\ \text{OUTSIDE DIAMETER}\,;\,70\text{mm} \end{array} \right)$$

FIG.6

PERFORMANCE DATA WHEN PERSON WITH VR VALUE OF 27mm WEARS PRESCRIPTION LENS WITH VR VALUE OF 27mm (FIG.5)

| ANGLE OF VISUAL LINE ($\theta$ DEGREES) TO LENS CONCAVE SURFACE SIDE | DISTANCE FROM OPTICAL CENTER (mm) | POWER ERROR (DIOPTRE) |
|---|---|---|
| 0.0 | 0 | 0 |
| 5.0 | 2.4 | 0 |
| 10.0 | 4.7 | 0.001 |
| 15.0 | 7.2 | 0 |
| 20.0 | 9.7 | −0.001 |
| 25.0 | 12.3 | −0.001 |
| 30.0 | 15.0 | 0 |
| 35.0 | 17.9 | 0.002 |
| 40.0 | 21.0 | 0 |
| 45.0 | 24.3 | −0.008 |
| 50.0 | 27.9 | 0 |
| 55.0 | INSUFFICIENT DIAMETER | INSUFFICIENT DIAMETER |
| 60.0 | INSUFFICIENT DIAMETER | INSUFFICIENT DIAMETER |

FIG.7

PERFORMANCE DATA WHEN PERSON WITH VR VALUE OF 33mm
WEARS PRESCRIPTION LENS WITH VR VALUE OF 27mm (FIG.5)

| ANGLE OF VISUAL LINE ($\theta$ DEGREES) TO LENS CONCAVE SURFACE SIDE | DISTANCE FROM OPTICAL CENTER (mm) | POWER ERROR (DIOPTRE) |
|---|---|---|
| 0.0 | 0 | 0 |
| 5.0 | 2.9 | 0.009 |
| 10.0 | 5.8 | 0.032 |
| 15.0 | 8.7 | 0.067 |
| 20.0 | 11.8 | 0.111 |
| 25.0 | 14.9 | 0.16 |
| 30.0 | 18.2 | 0.208 |
| 35.0 | 21.6 | 0.245 |
| 40.0 | 25.3 | 0.264 |
| 45.0 | 29.1 | 0.29 |

FIG.8

OPTICAL DATA OF PRESCRIPTION LENS WITH VR VALUE OF 33mm

| DISTANCE FROM OPTICAL CENTER (mm) | CONVEX SURFACE CURVE VALUE (DIOPTRE) | CONCAVE SURFACE CURVE VALUE (DIOPTRE) |
|---|---|---|
| 0.0 | 0.5 | 4.5 |
| 5.0 | 0.54 | 4.5 |
| 10.0 | 0.643 | 4.5 |
| 15.0 | 0.773 | 4.5 |
| 20.0 | 0.888 | 4.5 |
| 25.0 | 0.965 | 4.5 |
| 30.0 | 1.013 | 4.5 |
| 35.0 | 1.092 | 4.5 |

$$\left( \begin{array}{l} \text{POWER}: -4.00\,(\text{DIOPTRE}) \\ \text{REFRACTIVE INDEX}\,(nd)\,;\,1.50 \\ \text{OUTSIDE DIAMETER}\,;\,70\text{mm} \end{array} \right)$$

FIG.9

PERFORMANCE DATA WHEN PERSON WITH VR VALUE OF 33mm
WEARS PRESCRIPTION LENS WITH VR VALUE OF 33mm (FIG.5)

| ANGLE OF VISUAL LINE (θ DEGREES) TO LENS CONCAVE SURFACE SIDE | DISTANCE FROM OPTICAL CENTER (mm) | POWER ERROR (DIOPTRE) |
|---|---|---|
| 0.0 | 0 | 0 |
| 5.0 | 2.9 | 0 |
| 10.0 | 5.8 | 0 |
| 15.0 | 8.7 | 0 |
| 20.0 | 11.8 | 0 |
| 25.0 | 14.9 | 0 |
| 30.0 | 18.2 | 0 |
| 35.0 | 21.6 | −0.001 |
| 40.0 | 25.3 | 0 |
| 45.0 | 29.1 | 0.037 |

FIG.10

OPTICAL DATA OF PRESCRIPTION LENS WITH VR VALUE OF 27mm

| DISTANCE FROM OPTICAL CENTER (mm) | CONVEX SURFACE CURVE VALUE (DIOPTRE) | CONCAVE SURFACE CURVE VALUE (DIOPTRE) |
|---|---|---|
| 0.0 | 4.429 | 0.5 |
| 5.0 | 4.357 | 0.5 |
| 10.0 | 4.156 | 0.5 |
| 15.0 | 3.866 | 0.5 |
| 20.0 | 3.535 | 0.5 |
| 25.0 | 3.208 | 0.5 |
| 30.0 | 2.911 | 0.5 |
| 35.0 | 2.649 | 0.5 |

$$\left(\begin{array}{l}\text{POWER}: +4.00\,(\text{DIOPTRE})\\ \text{REFRACTIVE INDEX}\,(nd)\,;\,1.50\\ \text{OUTSIDE DIAMETER}\,;\,70\text{mm}\end{array}\right)$$

FIG.11

PERFORMANCE DATA WHEN PERSON WITH VR VALUE OF 27mm
WEARS PRESCRIPTION LENS WITH VR VALUE OF 27mm (FIG.10)

| ANGLE OF VISUAL LINE ($\theta$ DEGREES) TO LENS CONCAVE SURFACE SIDE | DISTANCE FROM OPTICAL CENTER (mm) | POWER ERROR (DIOPTRE) |
|---|---|---|
| 0.0 | 0 | 0 |
| 5.0 | 2.4 | 0 |
| 10.0 | 4.8 | 0 |
| 15.0 | 7.2 | 0 |
| 20.0 | 9.8 | 0 |
| 25.0 | 12.6 | 0 |
| 30.0 | 15.5 | 0 |
| 35.0 | 18.8 | 0 |
| 40.0 | 22.4 | 0 |
| 45.0 | 26.6 | 0.001 |
| 50.0 | 31.6 | 0 |

FIG.12

PERFORMANCE DATA WHEN PERSON WITH VR VALUE OF 33mm
WEARS PRESCRIPTION LENS WITH VR VALUE OF 27mm (FIG.10)

| ANGLE OF VISUAL LINE ($\theta$ DEGREES) TO LENS CONCAVE SURFACE SIDE | DISTANCE FROM OPTICAL CENTER (mm) | POWER ERROR (DIOPTRE) |
|---|---|---|
| 0.0 | 0 | 0 |
| 5.0 | 2.9 | −0.008 |
| 10.0 | 5.8 | −0.031 |
| 15.0 | 8.8 | −0.068 |
| 20.0 | 12.0 | −0.117 |
| 25.0 | 15.3 | −0.176 |
| 30.0 | 18.9 | −0.242 |
| 35.0 | 22.9 | −0.313 |
| 40.0 | 27.4 | −0.384 |
| 45.0 | 32.5 | −0.457 |

FIG.13

OPTICAL DATA OF PRESCRIPTION LENS WITH VR VALUE OF 33mm

| DISTANCE FROM OPTICAL CENTER (mm) | CONVEX SURFACE CURVE VALUE (DIOPTRE) | CONCAVE SURFACE CURVE VALUE (DIOPTRE) |
|---|---|---|
| 0.0 | 4.426 | 0.5 |
| 5.0 | 4.382 | 0.5 |
| 10.0 | 4.253 | 0.5 |
| 15.0 | 4.059 | 0.5 |
| 20.0 | 3.821 | 0.5 |
| 25.0 | 3.565 | 0.5 |
| 30.0 | 3.31 | 0.5 |
| 35.0 | 3.073 | 0.5 |

$$\left( \begin{array}{l} \text{POWER : +4.00 (DIOPTRE)} \\ \text{REFRACTIVE INDEX (nd) ; 1.50} \\ \text{OUTSIDE DIAMETER ; 70mm} \end{array} \right)$$

FIG.14

PERFORMANCE DATA WHEN PERSON WITH VR VALUE OF 33mm
WEARS PRESCRIPTION LENS WITH VR VALUE OF 33mm (FIG.13)

| ANGLE OF VISUAL LINE ($\theta$ DEGREES) TO LENS CONCAVE SURFACE SIDE | DISTANCE FROM OPTICAL CENTER (mm) | POWER ERROR (DIOPTRE) |
|---|---|---|
| 0.0 | 0 | 0 |
| 5.0 | 2.9 | 0 |
| 10.0 | 5.8 | 0 |
| 15.0 | 8.8 | 0 |
| 20.0 | 12.0 | 0 |
| 25.0 | 15.3 | 0 |
| 30.0 | 18.9 | 0 |
| 35.0 | 22.9 | 0 |
| 40.0 | 27.4 | 0 |
| 45.0 | 32.5 | 0 |

FIG.15

| CONVEX SURFACE CURVE (BASE CURVE) | LENS POWER | | | | | | | | | | | | |
|---|---|---|---|---|---|---|---|---|---|---|---|---|---|
| | -6 | -5 | -4 | -3 | -2 | -1 | -0 | 1 | 2 | 3 | 4 | 5 | 6 |
| 12 | 99 | 99 | 99 | 99 | 0.168 | 0.054 | -0.054 | -0.174 | -0.227 | -0.352 | -0.393 | -0.398 | -0.363 |
| 11 | 99 | 99 | 99 | 99 | 0.17 | 0.054 | -0.052 | -0.162 | -0.255 | -0.322 | -0.354 | -0.347 | -0.296 |
| 10 | 99 | 99 | 0.385 | 0.277 | 0.166 | 0.053 | -0.048 | -0.146 | -0.224 | -0.275 | -0.288 | -0.257 | -0.176 |
| 9 | 99 | 0.487 | 0.374 | 0.274 | 0.155 | 0.048 | -0.043 | -0.125 | -0.183 | -0.211 | -0.196 | -0.131 | -0.009 |
| 8 | 0.579 | 0.465 | 0.35 | 0.262 | 0.137 | 0.04 | -0.038 | -0.099 | -0.132 | -0.13 | -0.079 | -0.029 | 0.205 |
| 7 | 0.54 | 0.423 | 0.31 | 0.239 | 0.111 | 0.028 | -0.032 | -0.069 | -0.071 | -0.031 | 0.064 | 0.227 | 0.47 |
| 6 | 0.477 | 0.363 | 0.255 | 0.205 | 0.077 | 0.011 | -0.026 | -0.033 | 0.002 | 0.087 | 0.237 | 0.465 | 0.79 |
| 5 | 0.39 | 0.281 | 0.182 | 0.158 | 0.032 | -0.011 | -0.02 | 0.009 | 0.088 | 0.226 | 0.441 | 0.075 | 1.174 |
| 4 | 0.275 | 0.175 | 0.089 | 0.097 | -0.023 | -0.038 | -0.014 | 0.057 | 0.188 | 0.39 | 0.683 | 1.089 | 1.635 |
| 3 | 0.13 | 0.043 | -0.027 | 0.02 | -0.091 | -0.073 | -0.008 | 0.113 | 0.304 | 0.581 | 0.968 | 1.491 | 2.187 |
| 2 | -0.05 | -0.119 | -0.167 | -0.074 | -0.174 | -0.116 | -0.004 | 0.176 | 0.439 | 0.806 | 1.305 | 1.971 | 2.852 |
| 1 | -0.268 | -0.315 | -0.337 | -0.188 | -0.274 | -0.17 | -0.001 | 0.248 | 0.596 | 1.071 | 1.705 | 2.546 | 3.659 |
| 0 | -0.531 | -0.551 | -0.541 | -0.492 | -0.394 | -0.235 | 0 | 0.33 | 0.78 | 1.383 | 2.183 | 3.241 | 4.65 |

VR VALUE : 27mm
REFRACTIVE INDEX (nd) : 1.50

FIG.17

| CONVEX SURFACE CURVE (BASE CURVE) | LENS POWER | | | | | | | | | | | | |
|---|---|---|---|---|---|---|---|---|---|---|---|---|---|
| | -6 | -5 | -4 | -3 | -2 | -1 | 0 | 1 | 2 | 3 | 4 | 5 | 6 |
| 12 | 99 | 99 | 99 | 99 | 0.145 | 0.056 | -0.036 | -0.137 | -0.22 | -0.276 | -0.3 | -0.288 | -0.233 |
| 11 | 99 | 99 | 99 | 0.252 | 0.167 | 0.064 | -0.037 | -0.143 | -0.232 | -0.295 | -0.324 | -0.313 | -0.255 |
| 10 | 99 | 99 | 0.367 | 0.278 | 0.179 | 0.068 | -0.037 | -0.141 | -0.226 | -0.284 | -0.304 | -0.278 | -0.197 |
| 9 | 99 | 0.484 | 0.393 | 0.29 | 0.183 | 0.069 | -0.035 | -0.131 | -0.205 | -0.248 | -0.246 | -0.191 | -0.071 |
| 8 | 0.596 | 0.504 | 0.399 | 0.289 | 0.178 | 0.066 | -0.032 | -0.114 | -0.169 | -0.187 | -0.153 | -0.056 | 0.121 |
| 7 | 0.604 | 0.499 | 0.386 | 0.272 | 0.162 | 0.057 | -0.027 | -0.091 | -0.119 | -0.102 | -0.023 | 0.132 | 0.382 |
| 6 | 0.582 | 0.469 | 0.353 | 0.239 | 0.136 | 0.044 | -0.023 | -0.059 | -0.052 | 0.01 | 0.146 | 0.376 | 0.723 |
| 5 | 0.527 | 0.411 | 0.296 | 0.189 | 0.097 | 0.023 | -0.018 | -0.02 | 0.032 | 0.152 | 0.361 | 0.686 | 1.158 |
| 4 | 0.436 | 0.322 | 0.214 | 0.119 | 0.044 | -0.004 | -0.013 | 0.029 | 0.136 | 0.328 | 0.629 | 1.074 | 1.707 |
| 3 | 0.305 | 0.199 | 0.103 | 0.025 | -0.025 | -0.041 | -0.008 | 0.087 | 0.263 | 0.544 | 0.962 | 1.561 | 2.404 |
| 2 | 0.13 | 0.037 | -0.041 | -0.094 | -0.114 | -0.089 | -0.004 | 0.157 | 0.419 | 0.81 | 1.375 | 2.173 | 3.294 |
| 1 | -0.097 | -0.171 | -0.223 | -0.245 | -0.225 | -0.149 | -0.001 | 0.242 | 0.608 | 1.139 | 1.891 | 2.95 | 4.451 |
| 0 | -0.384 | -0.431 | -0.451 | -0.433 | -0.363 | -0.226 | 0 | 0.343 | 0.84 | 1.547 | 2.543 | 3.954 | 5.992 |

VR VALUE : 33mm
REFRACTIVE INDEX (nd) : 1.50

ABC=5.94 AAD=+2.00 DF=+3.00 <DESIGN SURFACE> VR=27.0

ABC=4.72 AAD=+2.00 DF=0.00 <DESIGN SURFACE> VR=27.0

ABC=3.49 AAD=+2.00 DF=-3.00 <DESIGN SURFACE> VR=27.0

FIG.21-1
ABC=5.94 AAD=+2.00 DF=+3.00 <DESIGN SURFACE> VR=33.0
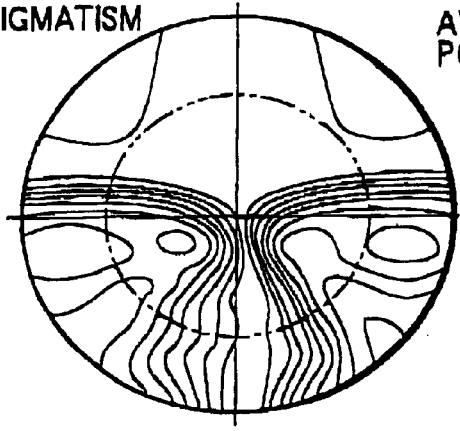
ASTIGMATISM
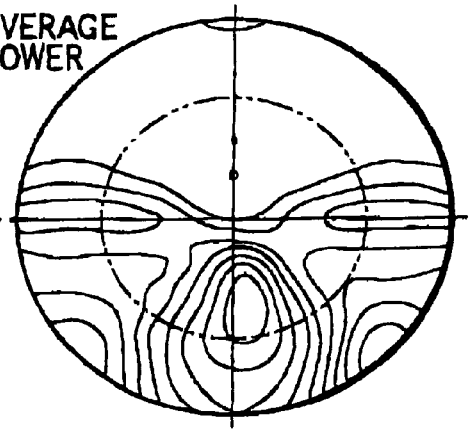
AVERAGE POWER
FIG.21-2
ABC=4.72 AAD=+2.00 DF=0.00 <DESIGN SURFACE> VR=33.0
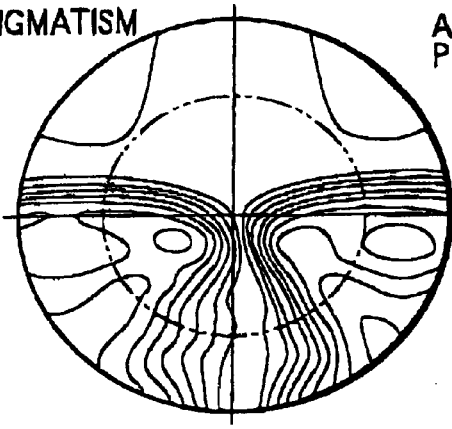
ASTIGMATISM
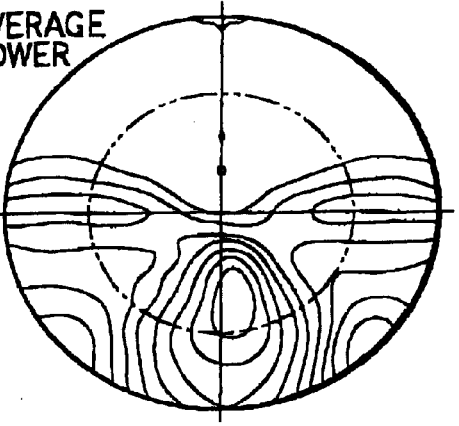
AVERAGE POWER
FIG.21-3
ABC=3.49 AAD=+2.00 DF=-3.00 <DESIGN SURFACE> VR=33.0
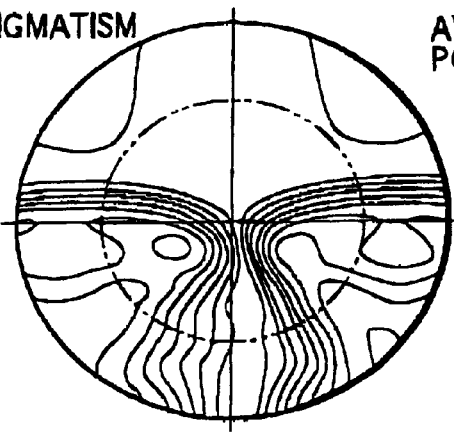
ASTIGMATISM
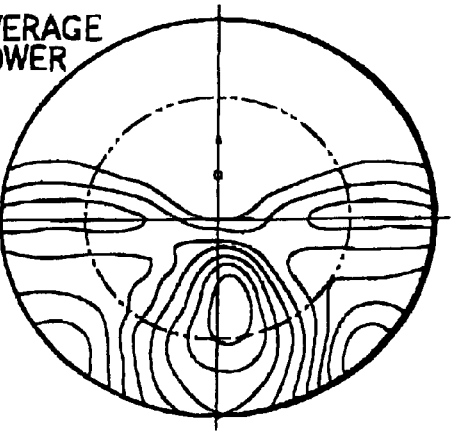
AVERAGE POWER

ABC=5.94 AAD=+2.00 DF=+3.00 <DESIGN SURFACE> VR=20.0

ABC=4.72 AAD=+2.00 DF=0.00 <DESIGN SURFACE> VR=20.0

ABC=3.49 AAD=+2.00 DF=-3.00 <DESIGN SURFACE> VR=20.0

FIG.23

INSET

| DF/VR | 20.0 | 27.0 | 33.0 |
|---|---|---|---|
| +3.00 | 2.5 | 3.2 | 3.7 |
| 0.00 | 2.3 | 2.8 | 3.2 |
| −3.00 | 2.1 | 2.5 | 2.9 |

(mm)

SPECTACLE LENS AND MANUFACTURING METHOD THEREFOR

BACKGROUND OF THE INVENTION

1. Field of the Invention

The present invention relates to a spectacle lens, which is designed and manufactured taking into consideration the distance between the center of rotation of the eye and a spectacle lens of an individual spectacles wearer, and a manufacturing method therefor.

2. Description of the Related Art

Despite the fact that spectacle lenses comprises single vision lenses and multifocal lenses (including progressive-power lenses) with different optical characteristics, they are generally designed on the basis of certain average utilization conditions. An example in which individual utilization conditions are taken into consideration is the method disclosed in Japanese Patent Application Laid-open No. 6-18823, in which there is proposed a progressive-power lens designed in consideration of individual utilization conditions, and there is disclosed the use of an aspheric surface, which is not accompanied by point symmetry axial symmetry in a prescription surface. The term "utilization conditions" as used here refers to the distance between the back surface of a spectacle lens (the surface of the eye side) and the vertex of the cornea, the tilt of the frame, and so forth, and an attempt is made to optimize a prescription surface by using these data in lens design.

However, the technique disclosed in the above-mentioned publication has an object to optimize a progressive-power lens comprising a distance portion, a near portion, and an intermediate portion, and having a prescription surface for both far and near vision use, and in particular, takes into consideration the importance of utilization conditions in the case of a spectacle lens, like a progressive-power lens, having a prescription, which supplements the accommodative power in near vision for presbyopia. This is because a progressive-power lens requires particularly accurate adjustment of s determining the conditions of a corrective prescription, is deemed particularly necessary. Therefore, the disclosure in the publication only emphasizes the accurateness of a near use prescription, and does not address overall wearing conditions for lenses such as spherical design lenses, aspherical single vision lenses, and bifocal lenses.

The present invention was devised based on the above-mentioned circumstances, and has as an object to provide a spectacle lens and a manufacturing method thereof, having a prescription surface which has been further optimized by reviewing the wearing conditions for all spectacle lenses, which was not paid much attention to in the past, and by taking into consideration individual wearing conditions.

SUMMARY OF THE INVENTION

As a means for solving the above-mentioned problems, a first invention is a spectacle lens characterized in that a spectacle lens is designed by using a value determined by either measuring or specifying for an individual spectacles wearer the value of the distance VR from a reference point on the back surface of a spectacle lens to the center of rotation of the eye, which adds together the value of the distance VC from a reference point of the back surface of a spectacle lens to the vertex of the cornea of the eye of the spectacles wearer at spectacle lenses wearing time, which is one of the required data in spectacle lens design, and the distance CR from the above-mentioned vertex of the cornea to the center of rotation of the eye, and manufacturing a spectacle lens based on this design specification.

A second invention is a spectacle lens related to the first invention, characterized in that the value of the distance CR from the above-mentioned vertex of the cornea to the center of rotation of the eye utilizes a value obtained based on measurement data obtained by measuring the axial length of the eye CO of a spectacles wearer.

A third invention is a spectacle lens related to either the first invention or the second invention, characterized in that the above-mentioned center of rotation of the eye is determined for distance vision, near vision, specified distance vision, and combination thereof, respectively, and is either selected and used on the basis of lens optical characteristics, or is used for appropriate viewing areas of a spectacle lens, respectively.

A fourth invention is a spectacle lens characterized in that it is processed by obtaining an optimized lens form based on an optical model of wearing conditions simulated in accordance with design and/or processing condition data information selected as needed from among information comprising a prescription value, which comprises spectacle lens information, spectacle frame information, and data related to the individual VR value of a spectacles wearer, layout information, and process specification information.

A fifth invention is a spectacle lens related to the fourth invention, characterized in that an amount of inset for near vision is determined based on the above-mentioned VR value.

A sixth invention is a spectacle lens related to the fourth invention, characterized in that the base curve of a convex surface is determined based on the above-mentioned VR value.

A seventh invention is a spectacle lens related to the fourth invention, characterized in that power error correction for a pre-set reference prescription surface is performed based on the above-mentioned VR value.

An eighth invention is a spectacle lens manufacturing method, wherein a terminal apparatus, which is installed at a spectacle lens ordering party, and an information processing system, which is installed at a spectacle lens processing party, and is connected by a telecommunications line to the above-mentioned terminal apparatus are provided for designing and manufacturing a spectacle lens based on information sent to the above-mentioned information processing system via the above-mentioned ordering party terminal apparatus; this spectacle lens manufacturing method comprising the steps of:

sending to the above-mentioned information processing system via the above-mentioned terminal apparatus design and/or processing condition data information selected as needed from among information comprising a prescription value, which comprises spectacle lens information, spectacle frame information, and data related to the VR value of each spectacles wearer, layout information, and process specification information; and obtaining an optimized lens form based on an optical model of wearing conditions simulated by the above-mentioned information processing system, determining processing conditions, and manufacturing a spectacle lens.

A ninth invention is a spectacle lens manufacturing method, wherein, a terminal apparatus, which is installed at a spectacle lens ordering party, and an information processing system, which is installed at a spectacle lens processing party, and is connected by a telecommunications line to the above-mentioned terminal apparatus are provided for designing and manufacturing a spectacle lens based on information sent to the above-mentioned information processing system via the above-mentioned ordering party terminal apparatus, this spectacle lens manufacturing method comprising the steps of:

sending to the above-mentioned information processing system via the above-mentioned terminal apparatus design and/or processing condition data information selected as needed from among information comprising a prescription value, which comprises spectacle lens information, spectacle frame information, and data related to the VR value of each spectacles wearer, layout information, and process specification information:

determining an optimized lens form based on an optical model of wearing conditions simulated by the above-mentioned information processing system;

also determining a standardized lens form by the above-mentioned information processing system using a standardized VR value in place of said VR value obtained for each spectacles wearer, while using other design and/or processing condition data sent via the above-mentioned terminal, comparing the optical characteristics of the above-mentioned optimized lens form against the optical characteristics of the above-mentioned standardized lens form, and based on the results of the comparison thereof, selecting either one of the above-mentioned lens forms, determining processing conditions of this selected lens form, and manufacturing a spectacle lens.

A tenth invention is a spectacle lens manufacturing method wherein, a terminal apparatus, which is installed at a spectacle lens ordering party, and an information processing system, which is installed at a spectacle lens processing party, and is connected by a telecommunications line to the above-mentioned terminal apparatus are provided for designing and manufacturing a spectacle lens based on information sent to the above-mentioned information processing system via the above-mentioned ordering party terminal apparatus, this spectacle lens manufacturing method comprising the steps of:

inputting via the above-mentioned terminal apparatus design and/or processing condition data information selected as needed from among information comprising a prescription value, which comprises spectacle lens information, spectacle frame information, and data related to the VR value of a spectacles wearer, layout information, and process specification information; and obtaining an optimized lens form based on an optical model of wearing conditions simulated on the basis of the inputted information thereof, determining processing conditions, and manufacturing a spectacle lens.

The present invention makes it possible to achieve a higher performance spectacle lens by designing a spectacle lens using a value determined for each individual spectacles wearer, as a value of distance VR from a reference point on the back surface of a spectacle lens to the center of rotation of the eye when the spectacle lenses is worn, which is one of the necessary data in the lens design, and manufacturing the lens based on the design specifications thus established.

Conventional thinking holds that it is sufficient to use a standard value as a VR value, and that the effects that individual differences of a VR value have on lens performance are practically negligible. That is, as indicated in the above-mentioned Japanese Patent Application Laid-open No. H6-018823, with the prior art, a spectacle lens has been designed and manufactured using a standard value as the distance from the center of rotation of the eye to the vertex of the cornea. However, the fact is that although a VR value determined on the basis of this standard distance is known to be a value that differs from individual to individual, it has not been well known or accurately verified what effect this difference has on optical effects, that is, on design of the spectacle lenses. There are a variety of design methods for an optical surface of a spectacle lens, and the main concern was optimization of design thereof, while it was out of consideration to verify or simulate the effect of a VR value for each design. Further, quite naturally, sufficient study has not been done on how this value should be fed back to the design and manufacture processes.

The inventors investigated the differences in VR values between individuals, and conducted research on this subject using a simulation method such as the ray tracing method recently developed. They finally found out that differences in VR values between individuals are unexpectedly large, and the effects of these differences on lens performance are also greater than expected. Based on the results of this research, lenses of common basic specifications were actually designed and manufactured in two types, that is, lenses for which differences in VR values between individuals were taken into consideration, and those for which they were not, and their performance were compared. The results the inventors obtained greatly exceeded their expectations.

That is, it was ascertained that there was large difference in optical performance of a spectacle lens in a case where a spectacle lens designed and manufactured based on a standard VR value was used for an individual having a different VR value from the standard VR value, and such difference reached an amount requiring correction. Specifically, there are effects related to optical layout related to aberration of a single-focus lens, the positioning of the segment height when the refracting power at the vertex of the distance portion in bifocal lenses is different between the right and left lenses, an amount of inset of the near portion in progressive-power lenses, height of the near portion and so on.

Here, the value of the sum of a value of the distance VC from a reference point on the back surface of a spectacle lens to the vertex of the cornea of the eye of the spectacles wearer as found when spectacle lenses are being worn by the wearer, and a value of the distance CR from this vertex of the cornea to the center of rotation of the eye can be used as the VR value.

For the present invention, the most important factor is the CR value, and because a CR value will differ physiologically from individual to individual, it is desirable that a CR value be accurately calculated by measurement. However, according to circumstances, individual CR values will not be necessary for all the cases. For example, it is also possible that CR values are classified into 2 to 5 groups, a value representing the respective groups is set, and this value is used as a CR value for the group. In the present invention, values as designated by an ordering side, including measured values in the broad sense are used as the CR values in lens design.

As a method for measuring a CR value, for example, it is possible to use the eye rotation point measuring apparatus proposed by G. A. Fry and W. W. Hill and described in an article titled "THE CENTER OF ROTATION OF THE EYE" in the AMERICAN JOURNAL OF OPTOMETRY and ARCHIVES of AMERICAN ACADEMY OF OPTOM- ETRY (vol. 39, published November 1962). Further, there is also a method, by which a CR value is found by computing from the point of intersection of lines of sight of different directions.

Further, as a simple and practical method, there is a method of utilizing a widely used apparatus for measuring the axial length of the eye. That is, it is a method, which measures the axial length of the eye, wherefrom finds the central point of rotation of the eye by calculation. For example, in this method, general statistical data of the relative position of the rotating point of the eye to a previously measured axial length are used. For example, if it is supposed that, as average data, the axial length of the eye is 24 millimeters, and the distance from the vertex of the cornea to the central point of rotation (CR) is 13 millimeters, 13/24=0.54 constitutes the utilization ratio. Therefore, in the case of a person, for whom the axial length of the eye is detected as 27 millimeters, using this relative position coefficient 0.54, it is supposed that the value of this person's CR is 27 millimeters×0.54=14.6 millimeters. In addition thereto, various methods can be used to find the correlation between the point of rotation of the eye and the axial length of the eye for establishing the point of rotation of the eye.

There are various apparatuses for measuring the axial length of the eye, including, for example, ultrasonic sound measuring apparatuses and sight line direction detecting apparatus. Further, the location of the central point of rotation of the eye is not a fixed point in the eye, but rather is believed to change slightly in accordance with the direction or distance one is trying to view, as when viewing at a distance, and when viewing up close. Therefore, preferably, it is desirable to carry out processing on data differently according to the properties of the lens being designed, before using same in a design. For example, in the case of a progressive-power lens, different values of the location of central point of rotation as found in distance vision and in near vision are used respectively, for the distance vision region and the near vision region; in the case of a single vision lens for distance vision, a value of the location of central point of rotation as found in distance vision is used; and in the case of single vision lens for presbyopia, a value of the location of central point of rotation as found in near vision is used. Further, it is also possible to treat measurement data from one direction as basic data, apply corrective values thereto, and use this measurement data in various ways.

Further, there is no special measuring apparatus for determining a VC value like there is for a CR value, but it is important to accurately determine a VC value. But this value differs from a CR value, and is not a purely physiological value, and since there is also a correlation between a VC value and the wearing condition of a frame, this value is adjusted by the side that transmits a prescription value (an optometrist, optician, or the like). Since there are also cases in which a VC value can be adjusted to a certain prescribed value (for example, a value determined by an optician), in the present invention, VC values are treated, in the broad sense, as designated values.

In this manner, according to the present invention, spectacle lens design is performed for the right and left eyes of each individual by using a VC value for the distance from a reference point on the back surface of a spectacle lens to the vertex of the cornea of the eye of a spectacles wearer, and a CR value for the distance from the vertex of the cornea to the center of rotation of the eye, but it is also important to compare a spectacle lens designed according to the present invention against a standard spectacle lens designed and manufactured by an existing design technique, and to give comparative data as to how different they are.

That is, because lenses, which were designed as spectacle lenses using a VC value and a CR value of the right and left eyes of each individual, respectively, are individually designed products that are manufactured one product at a time, manufacturing costs are higher than for a standardized product (standard product) that is manufactured in volume.

However, there are cases when even lenses, which were designed as spectacle lenses using a VC value and a CR value of the right and left eyes of each individual, respectively, become identical to a standard product, and there are cases when even if there is a difference, it is only a slight difference. In such cases, it will be disadvantageous for the end user to select and purchase a relatively expensive product that is manufactured one product at a time. Naturally, it is clear that the performance of the spectacle lenses by a design based on individual by individual information would not differ greatly even when compared to a standard product. In other words, it is believed the user would feel like the newly prepared spectacles do not differ much compared to the spectacles he had used up until now, and would feel displeased at having selected and purchased a relatively expensive product.

Thus, it is necessary to clarify the difference in optical characteristics (astigmatism, average power, power error, and so forth) between a standard product and a spectacle lens by a design based on individual by individual information when trying to make a selection prior to ordering a spectacle lens.

Thus, when ordering information, such as a prescription value, which comprises spectacle lens information, spectacle frame information, and data related to a VR value of each spectacles wearer from a spectacles store, layout information, and process specification information is sent to the information processing system of the spectacles processor side from the terminal apparatus of the spectacles store side, it is necessary to compute in the information processing system of the processor side the difference between a standardized product and spectacle lenses by a design based on individual by individual information, which was either ordered, or inquired about, to send a reply to the terminal apparatus of the spectacles store side, and to display optical characteristic information, such as an astigmatism distribution chart, and an average power distribution chart.

By providing comparative information in this manner, it becomes possible to cancel the selection of an individually designed product and purchase a standardized product when there is not much difference between an individually designed product and a standardized product.

BRIEF DESCRIPTION OF THE DRAWINGS

FIG. 2 is a schematic diagram of an ordering screen;

FIG. 5 is a diagram showing optical data of a prescription lens with a 27 mm VR value, which was manufactured using a spectacle lens manufacturing method related to an aspect of the embodiment;

FIG. 6 is a diagram showing performance data of a case in which a person with a 27 mm VR value wore a prescription lens with a 27 mm VR value (Refer to FIG. 5);

FIG. 7 is a diagram showing performance data of a case in which a person with a 33 mm VR value wore a prescription lens with a 27 mm VR value (Refer to FIG. 5);

FIG. 8 is a diagram showing optical data of a prescription lens with a 33 mm VR value;

FIG. 9 is a diagram showing performance data of a case in which a person with a 33 mm VR value wore a prescription lens with a 33 mm VR value (Refer to FIG. 8);

FIG. 10 is a diagram showing optical data of a prescription lens with a 27 mm VR value in a case in which power is +4.00 (D):

FIG. 11 is a diagram showing performance data of a case in which a person with a 27 mm VR value wore a prescription lens with a 27 mm VR value (Refer to FIG. 10);

FIG. 12 is a diagram showing performance data of a case in which a person with a 33 mm VR value wore a prescription lens with a 27 mm VR value (Refer to FIG. 10);

FIG. 13 is a diagram showing optical data of a prescription lens with a 33 mm VR value in a case in which power is +4.00 (D);

FIG. 14 is a diagram showing performance data of a case in which a person with a 33 mm VR value wore a prescription lens with a 33 mm VR value (Refer to FIG. 13);

FIG. 15 is a table for determining and showing power errors for various combinations of convex surface curve (base curve) values and lens power values in a case in which there is a single vision lens, and the VR value is set at 27 mm;

FIG. 17 is a table for determining and showing power errors for various combinations of convex surface curve (base curve) values and lens power values in a case in which there is a single vision lens, and the VR value is set at 33 mm;

FIGS. 20-1, 20-2, and 20-3 are diagrams showing the distribution of surface astigmatism and surface average power of progressive refracting surfaces in design examples of a progressive refracting surface of a progressive-power lens with addition 2.00 D when, as a condition, VR=27.0 mm is provided as a standard value;

FIGS. 21-1, 21-2, and 21-3 are diagrams showing the distribution of surface astigmatism and surface average power of progressive refracting surfaces in design examples of when only the VR value of the design examples of FIG. 20 is treated as a value that is larger than the standard value, and is given as VR=33.0 mm;

FIGS. 22-1, 22-2, and 22-3 are diagrams showing the distribution of surface astigmatism and surface average power of progressive refracting surfaces in design examples when only the VR value of the design examples of FIG. 20 is treated as a value that is smaller than the standard value, and is given as VR=20.0 mm;

FIG. 23 is a diagram showing the results of calculating as specific numerals an inset INSET of a near portion provided to the respective determined progressive retracting surfaces shown in FIGS. 20, 21, and 22:

DESCRIPTION OF THE PREFERRED EMBODIMENTS

Figure 1:
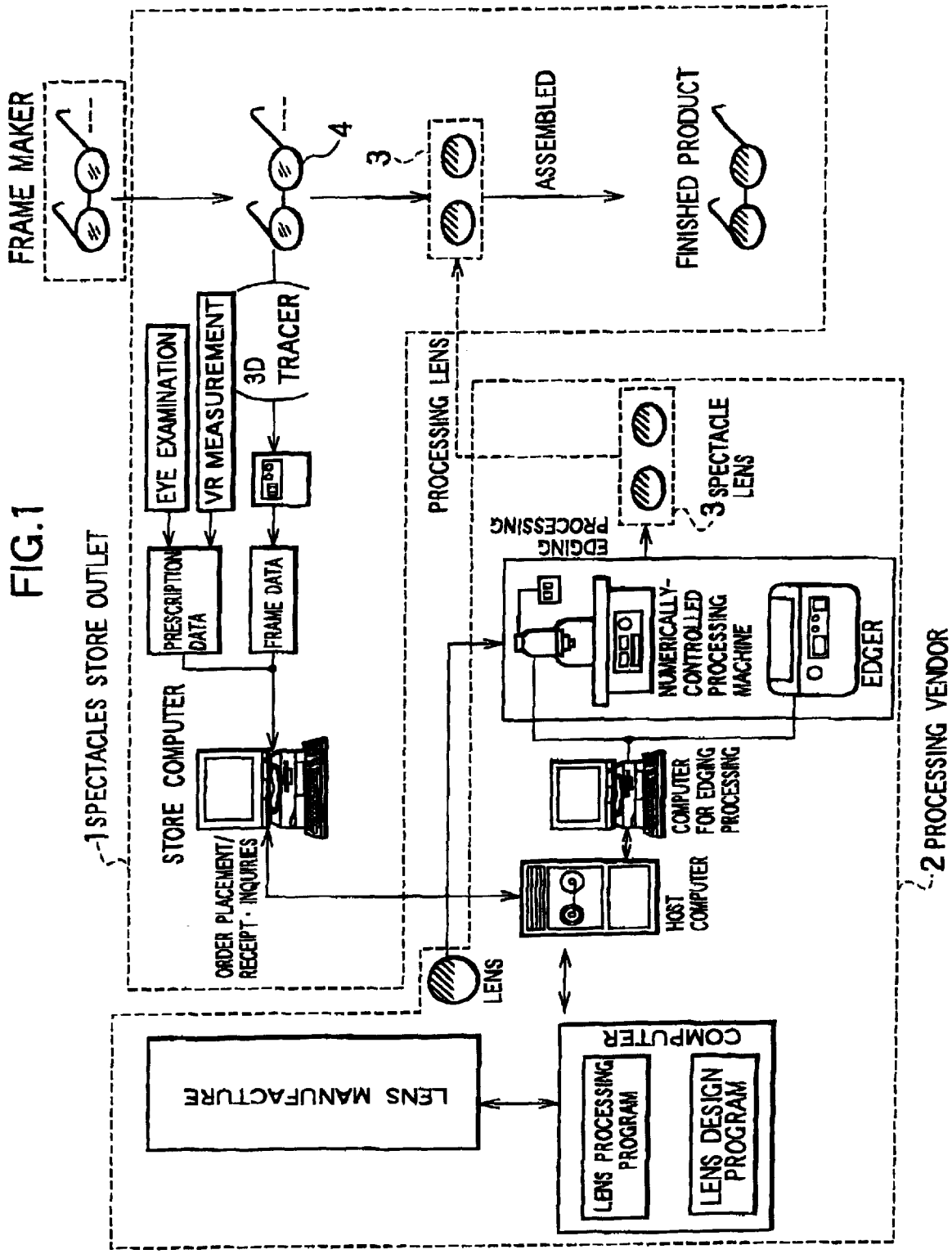
FIG. 1 is a schematic diagram of a manufacturing method of a spectacle lens related to an aspect of the embodiment of the present invention.
Figure 3:
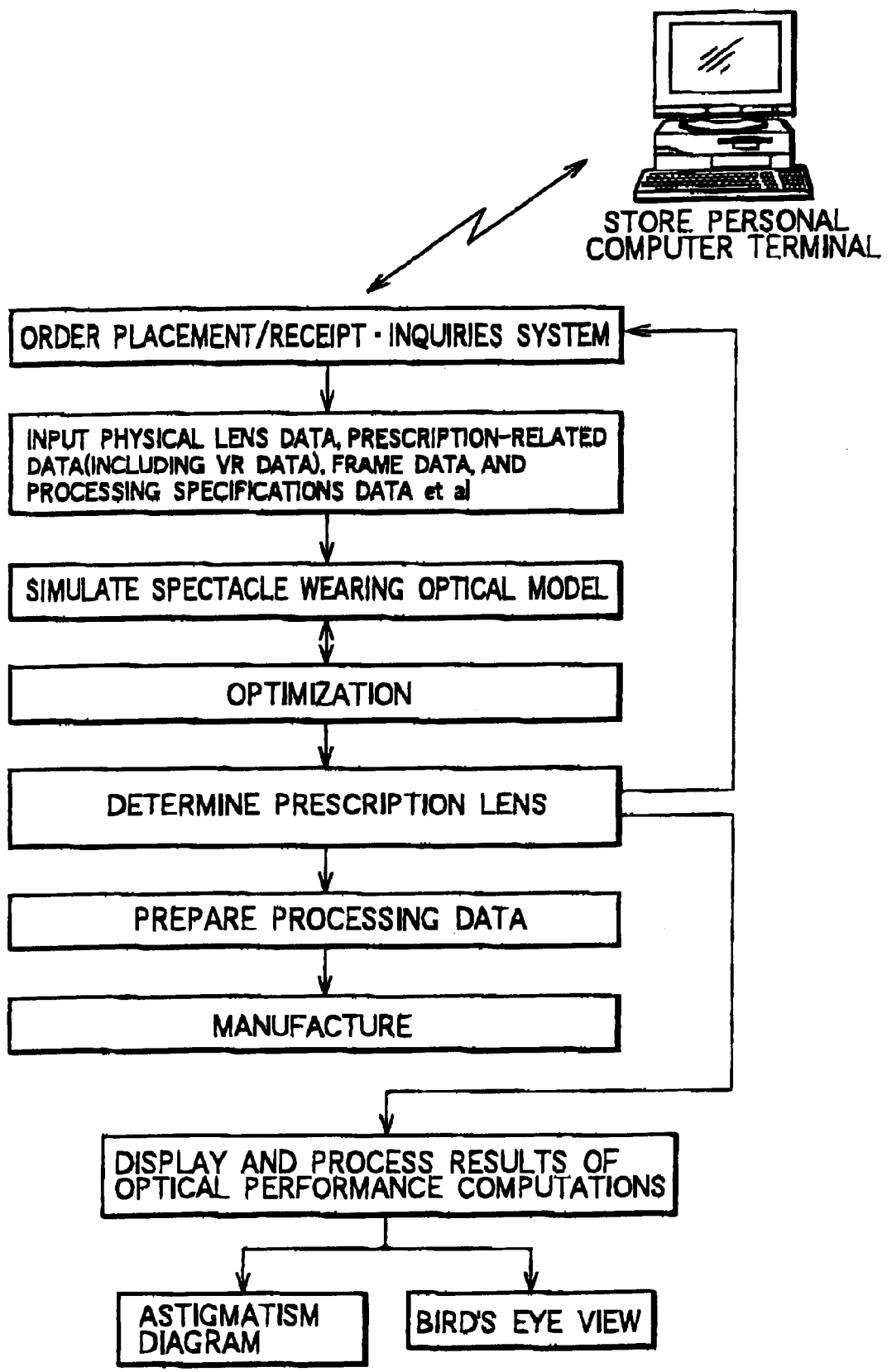
FIG. 3 is a flowchart of a manufacturing process of a spectacle lens.
Figure 4:
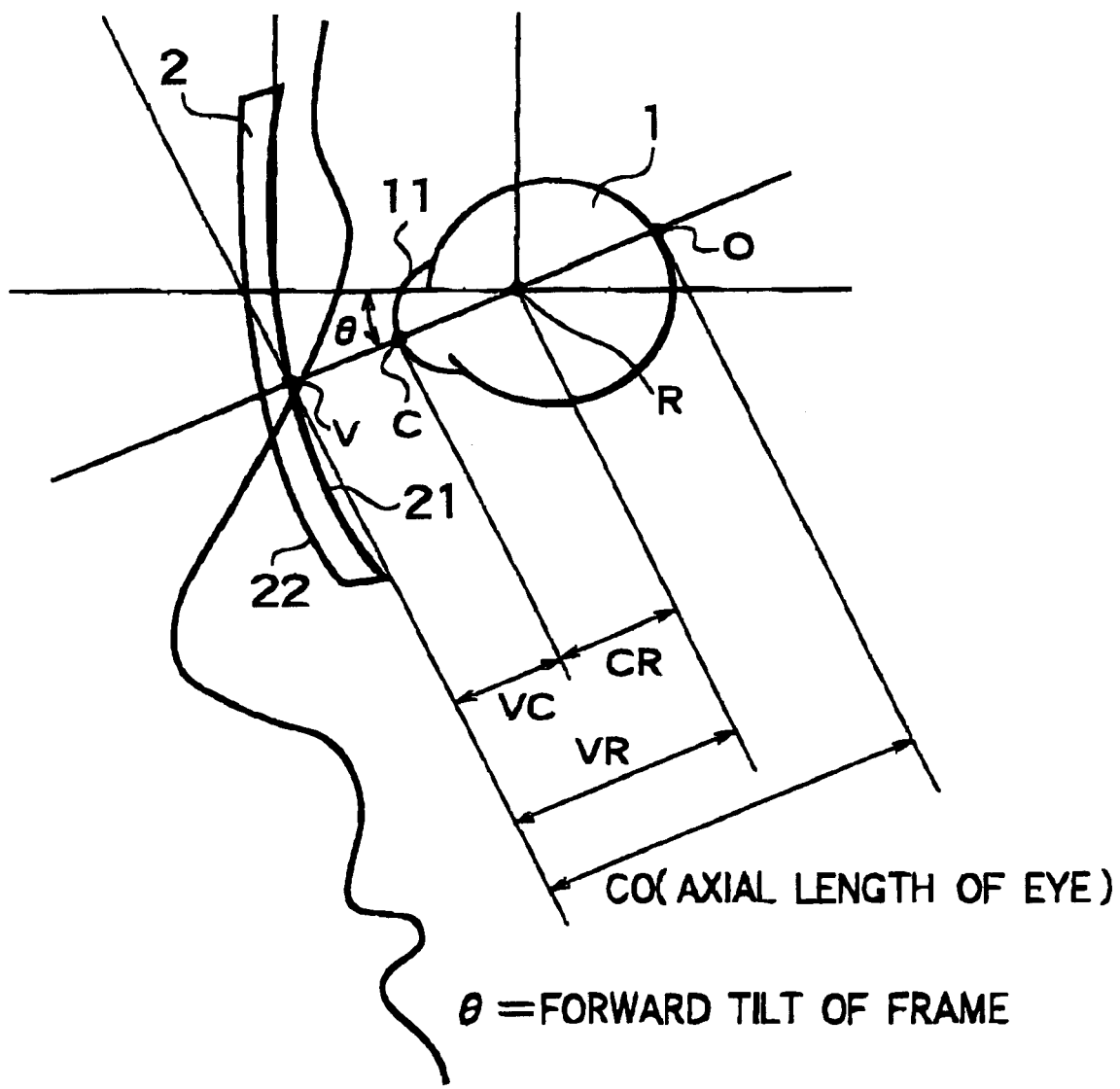
FIG. 4 is a schematic diagram of an optical model of spectacles wearing.

Aspects of the embodiment of the present invention will be explained hereinbelow based on the figures. FIG. 1 is a schematic diagram of a manufacturing method of a spectacle lens related to an aspect of the embodiment of the present invention, FIG. 2 is a schematic diagram of an ordering screen, FIG. 3 is a flowchart of a manufacturing process of a spectacle lens, and FIG. 4 is a schematic diagram of an optical model of spectacles wearing.

In FIG. 1, Reference Numeral 1 is a spectacles store (ordering party) and Reference Numeral 2 is a spectacles processor (processing party). The spectacle lens manufacturing method of this aspect of the embodiment is such that a spectacle lens 3 is designed and manufactured based on information sent via a terminal apparatus installed at the spectacles store (ordering party) 1 to an information processing system installed at the processor (processing party) 2.

That is, via the above-mentioned terminal apparatus there is sent to the above-mentioned information processing system design and/or processing condition data information selected as needed from among information comprising a prescription value, which comprises spectacle lens information, spectacle frame information, and data related to the individual VR value of a spectacles wearer, layout information, and process specification information. The above-mentioned information processing system determines processing conditions by processing the information thereof, and obtains an optimized lens form based on an optical model of simulated wearing conditions, and a spectacle lens is manufactured. These processes will be explained in detail hereinbelow.

(Preparation of Prescription Data and Lens Data)

The preparation of prescription data and lens data for a spectacles wearer is performed at a spectacles store. Firstly, to determine a VR value for an individual (one of the prescription data), which is a characteristic of this aspect of the embodiment, a CR value of the right eye and left eye of each customer is measured, respectively, using a CR measuring apparatus. However, in this aspect of the embodiment, as a simplified method, first, the axial length of the eye of the left and right eyes, respectively, are measured using a popular commercial axial length measuring apparatus, and next, using a comparison coefficient of the relative location of the center of rotation of the eye (vertical direction) relative to the axial length of the eye, a CR value is computed via an operation, and this is used as the CR value for the left eye and right eye.

Next, the prescription is confirmed once again using either optometry data (spherical power, cylindrical power, cylinder axis, prismatic power, prism base setting, addition, distance PD, near PD, and so forth) from a customer's optometrist, or, as necessary, based on the optometry data thereof, using optometry equipment installed at a spectacles store. Then, lens data in prepared by making determinations based on interaction with the customer as to lens processing specification data, comprising the type of lens (single vision (spherical, aspherical), multifocal (bifocal, progressive) and so forth), power and type of lens material (glass, plastic), specification of surface processing options (tinting, wear-resistant coating (hard coating), antireflection coating, protection against ultraviolet rays, and so forth), center thickness, edge thickness, prism, and decentration, and layout specification data (for example, the inset, and specification for the location of the segment of a bifocal lens). Further, type of lens, and surface processing options can be substituted for by specifying at lens maker specification, and the model name thereof.

(Preparation of Frame Date)

Next, the preparation of frame data is carried out. Frames supplied by a frame maker are stocked at a spectacles store 1, and a customer selects a frame 4 of his/her liking. At a spectacles store, shape measurements are taken for the selected frame thereof using an installed 3-dimensional frame shape measuring apparatus (for example, GT-1000, 3DFT by Hoya Corporation), and frame data (for example, shape, FPD, bridge, frame curve, rim thickness, frame material, type (full frame, rimron, rimless), and so forth) is prepared.

However, the notation method for acquisition of frame data differs for each frame maker, and there are also various acquisition methods. The above-mentioned method indicated a method by which an actual frame shape is measured, but a method, in which information is already attached to a frame beforehand as a shape data barcode tag, acquires frame data by reading the data thereof. Further, in a case in which all frame data can be extracted from a frame model, frame data is extracted from the model data thereof.

Next, taking into consideration the actual shape of the head of a customer, lens data, frame shape characteristics, and wearing conditions, the frame tilt angle is determined, and the distance between the vertex of the cornea of the eye and the concave surface of a lens (VC value) is determined. A VR value is determined from the sum of this VC value and the CR value determined above.

(Data Communications Between Spectacles Store and Lens Maker Via Personal Computer)

Next, data communications are carried out with a host computer at a lens maker using a personal computer (terminal) installed at an outlet of a spectacles store. A spectacle lens ordering and inquiries system, which is ordinarily utilized in the spectacles industry (for example, a typical system is the Hoya Online System manufactured by Hoya Corporation), can be used in the data communications thereof. To send to a host computer the various information necessary to design and manufacture a spectacles lens required by the above-mentioned spectacles store, this data communications is performed using a predetermined ordering screen. FIG. 2 is the system ordering screen thereof. Various information, comprising a VR value, is sent to a host computer via the ordering screen.

(Design and Manufacture)

At the plant side (processing party), a host computer inputs and processes the various information sent from the above-mentioned terminal, and performs lens design simulation. FIG. 3 is a flowchart of a spectacle lens manufacturing process, and is a diagram showing a process, comprising simulation up until the manufacture of a prescription lens thereof.

In FIG. 3, first prescribed input items are checked. In the data sent from the above-mentioned spectacles store, the main items thereof, which are related to optical lens design, are physical lens data (refractive index, Abbe number, 1specific gravity, and so forth), prescription-related data (lens power, cylinder axis, addition, prismatic power, prism base setting, decentration, outer diameter, distance PD, near PD, lens thickness, VR value (CR value+VC value)), frame data (shape, DBL, FPD, frame curve, frame curve, and so forth), frame forward tilt, type of bevel, and other process specification data. As for lens data and frame data in particular, it is desirable to acquire basic physical and design data from a manufacturer beforehand.

And then, a spectacles wearing optical model for lens design is comprehensively simulated from the data thereof. FIG. 4 is a schematic diagram of an optical model of spectacles wearing, and is a diagram, which partially shows an outline of an optical model from the side. As shown in FIG. 4, a lens is positioned in front of the eye by estimating the forward tilt of the frame. In this case, the VR value is the sum of the distance from the center of rotation R of the eye 1 to the vertex C of the cornea 11, that is, the CR value, and the distance from the vertex of the cornea C to a reference point V on the back surface 21 of a lens 2 (point of intersection of an extension of a straight line CR and a lens back surface 21) (VC value). In particular, if factors affecting the VR value, such as the improved physical constitution of spectacles wearers in recent years, differences in the skeletal structures of individuals, differences in the shape of the eye, and the enlargement and diversification of frames, are also added, it has been ascertained via studies that the VR value is considerably broad, and in general is estimated to range from roughly 15 millimeters to around 44 millimeters.

Next, optimization computations are performed by computer using lens design program calculations, the surface form of a concave surface, convex surface, and lens thickness are determined, and a prescription lens is determined. Here, for a prescription lens, options based on variations of spectacle shape, such as an aspheric surface, spheric surface, bifocal, progressive, refractive index, and curvature, are taken into consideration, and either 1 type or a plurality of types of candidates are shown.

Furthermore, when a VC value used when measuring visual acuity differs greatly from a VC value determined by actual measurement (a value used in lens form design), there are cases in which it is not possible to deal with this difference via frame shape corrections (adjusting of the pads, temples, and front of a frame) and fitting adjustments (positional adjustments at the nose, and ears). In cases such as this, since it is impossible for the power according to visual acuity measurements to indicate the power during spectacles wearing, there are cases when corrections become necessary. This point will be explained hereinbelow.

Ordinarily, a visual acuity examination apparatus uses a fixed VC value (hereinbelow, this value is referred to as VC0. Ordinarily, it is 14 mm). Then, using this examination apparatus, an examiner (spectacles store, ophthalmologist, optician) obtains a corrective power value (D0). In the case of this embodiment, an examiner also takes into consideration frame shape, the shape of a patient's face, the corrective power value (D0) obtained via an optometry, and type of lens, and determines a VC value. However, for example, more specifically, in a situation in which the eyes are set deep in the facial features of a patient, in the case of a lens with a deep minus lens back surface curve, the VC value is not the ordinarily used value of VC0 (14 mm), and there are case which use as a prescription VC value a large measured VC value (for example, 20 mm).

In a case such as this, the corrective power value (D0) at measurement must be corrected yet further, and a prescription lens power value (D) is calculated from the above-mentioned prescription VC value, the above-mentioned VC0 value, and D0 value using the relational expression hereinbelow.

$$D=D0/(1+(VC-VC0) \cdot D0/1000)$$

Further, the lens power correction quantity ($\Delta D$) becomes $$\Delta D=D0/(1+(VC-VC0) \cdot D0/1000)-D0$$

and when, for example, D0=−4 diopter, VC=33 mm, and VC0=27 mm, the computation is such that D=−0.098 diopter.

At spectacle lens design, it is desirable that the corrective power thereof be corrected uniformly over the entire surface of a spectacle. Preferably, D is less than 0.005.

Furthermore, in this embodiment, the ordering party uses an ordering system, which supplies (specifies) a VC value, CR value, D value (power) and so forth to the plant side, but if this embodiment is constituted such that in accordance with the ordering party transmitting initial information to the plant side, corrective computations are performed at the plant side, and design lens information is returned to the ordering party, and the ordering party references this information, prepares ordering information, and sends it to the plant side once again, the burden on the ordering party can be reduced.

The basic contents performed by a lens design program will be explained hereinbelow. The contents thereof will differ slightly in the case of a single vision lens, and in the case of a multifocal lens. However, in either case, the basic thinking regarding the following points is the same.

That is, first, a lens curved surface form is initially selected as a candidate for use, and the optical characteristics of the lens thereof are determined using a ray tracing method or the like. Next, a lens curved surface form, the curved surface of which differs in accordance with a prescribed rule from the lens curved surface form thereof, is selected as a next candidate, and the optical characteristics of the lens thereof are determined in the same manner using a ray tracing method or the like. And then, the optical characteristics of both lenses are evaluated by a prescribed method, and based on the results thereof, a determination is made to either use a candidate thereof, or to offer a subsequent candidate. So-called optimization is performed by repeating the above process again and again until a determination is made to use a candidate lens curved surface form. Furthermore, as the VR value of a spectacles wearing optical model utilized when executing the above-mentioned ray tracing method, a value determined for an individual is used.

The design of a single vision lens is performed as explained hereinbelow. Since the ray tracing method itself is a well-known technology, details regarding same will be omitted.

If explained based on the flowchart of FIG. 3, first, design-related data, comprising a VR, is treated as design input data. Based on the input data thereof, the spectacles optical model of FIG. 4 is assumed, and ray tracing computations are carried out. In FIG. 4, the starting point of ray tracing is the point of rotation (R). Points for carrying out ray tracing computations are set over the entire surface of a lens 2. The more numerous the number of set points, the more precise a design can be. For example, roughly 3 to 30,000 points can be used on a spectacle lens. And then, in a state, in which a light ray of a set lens surface location thereof is projected such that it passes through the point of rotation (R) thereof, and is able to pass through a spectacle lens back surface 21, that is separated by a distance VR at the optical axis lens center, and subsequently through a spectacle lens front surface 22, the optical quantity (ordinarily, astigmatism, and curvature of field aberration) for each light ray is computed. Here, in the ray tracing computation of this embodiment, the VC value and CR value, which are related to the vertex of the cornea (C), are not used alone, but rather, the value of VR, which is the sum of the two, is used.

Here, in the case of an aspheric lens design, an aspheric lens surface is expressed beforehand by an expression comprising a functionalized aspheric coefficient. A basic aspheric expression thereof is well known in the field of optical lenses, and furthermore, based thereon, as an application thereof, there are well-known expressions that determine functionalized optical surfaces on the basis of various lens design concepts. As specific aspheric expressions, it is possible to cite, for example, Japanese Patent Application Laid-open No.S 52-115242, Japanese Patent Application Laid-open No. S58-24112, Japanese Patent Application Laid-open No. S61-501113, Japanese Patent Application Laid-open No. S64-40926, and WO97/26578. According to these patents, a lens surface can be determined by determining an aspheric coefficient in a disclosed expression.

In the present embodiment, to determine an aspheric coefficient, that is, to determine a prescription lens in the flowchart of FIG. 3, there is performed an optimization computation (method of least square attenuation), which changes an aspheric coefficient in a direction that reduces a sum of squares (called a merit function) weighted by the above-mentioned computed optical quantity that accompanies each light ray. Then, when a merit function constitutes less than a desired set optical quantity, an optimization computation is complete. An aspheric coefficient is determined at this point in time, and a lens form is decided. Furthermore, the above-mentioned optical quantities are clear even from the optical model of FIG. 4, but these optical quantities are not individually functionally dependent on a VC value, and a CR value, which are 2 elements of a VR value, but rather have a functional relation to a VR value, which is the sum of a VC value and a CR value.

FIG. 5 is a diagram showing optical data of a prescription lens with a VR value of 27 mm, which was determined by the above-mentioned design technique. The basic specification for this prescription lens is a prescription for myopia, and is a single vision aspheric plastic lens (diethylene glycol bis allyl carbonate) of lens power: −4.00 diopter (D), refractive index (nd): 1.50, and outside diameter: 70 mm.

FIG. 6 is a diagram showing performance data of a case in which a person with a VR value of 27 mm wore a prescription lens with a VR value of 27 mm (Refer to FIG. 5). As shown in FIG. 6, there is practically no power error (average power error) in any angle of visual line, and it is evident that a lens design, which strives for optimization in an average power, has been performed, and that this lens design has extremely outstanding performance.

FIG. 7 is a diagram showing performance data of a case in which a person with a VR value of 33 mm wore a prescription lens with a VR value of 27 mm (Refer to FIG. 5) (Target distance was set at infinity. Same holds true hereinbelow). As shown in FIG. 7, it turns out that large power errors (average power errors) are generated by the angle of visual line. That is, it turns out that power errors occur when a angle of visual line moves to a side field of view, which is away from the center of the lens, for example, in a direction of 30 degrees or 35 degrees. The quantity thereof is 0.245 (D) at 35 degrees, and, as can be seen, is extremely large. For a spectacle lens, dioptric power classification is generally done at a pitch of 0.25 (D), and the power error value thereof is not a quantity that can be tolerated, indicating the need to select another prescription lens. Because all spectacle lenses ordinarily use the same design for a single lens item, the case shown in FIG. 7 can be thought of as a model case that occurs on a daily basis.

FIG. 8 is a diagram showing optical data of a prescription lens with a VR value of 33 mm. Compared to the optical data of a prescription lens with a VR value of 27 mm (Refer to FIG. 5), the difference in convex surface curve values is 0.0 diopter at a distance from the optical center of 0.0 mm, and constitutes a −0.184 diopter at 15 mm. Because this is an aspheric lens design, unlike a spheric lens design, a non-uniform convex curve correction is performed along the lens radial, and this differs from a uniform curve correction of power correction processing.

FIG. 9 is a diagram showing performance data of a case in which a person with a VR value of 33 mm wore a prescription lens with a VR value of 33 mm (Refer to FIG. 8). As shown in FIG. 9, there is practically no power error (average power error) in any angle of visual line, and it is evident that a lens design, which strives for optimization in an average power, has been performed, and that this lens design has extremely outstanding performance.

FIG. 10 is a diagram showing optical data of a prescription lens with a VR value of 27 mm in a case in which the power is a prescription for hyperopia, and is +4.00 (D), FIG. 11 is a diagram showing performance data of a case in which a person with a VR value of 27 mm wore a prescription lens with a VR value of 27 mm (Refer to FIG. 10) (Target distance is set at infinity. The same holds true for hereinbelow), FIG. 12 is a diagram showing performance data of a case in which a person with a VR value of 33 mm wore a prescription lens with a VR value of 27 mm (Refer to FIG. 10), FIG. 13 is a diagram showing optical data of a prescription lens with a VR value of 33 mm in a case in which power is +4.00 (D), and FIG. 14 is a diagram showing performance data of a case in which a person with a VR value of 33 mm wore a prescription lens with a VR value of 33 mm (Refer to FIG. 13). It is evident that the examples shown in these figures achieved the same results as the case shown in FIG. 5–FIG. 9.

Figure 16:
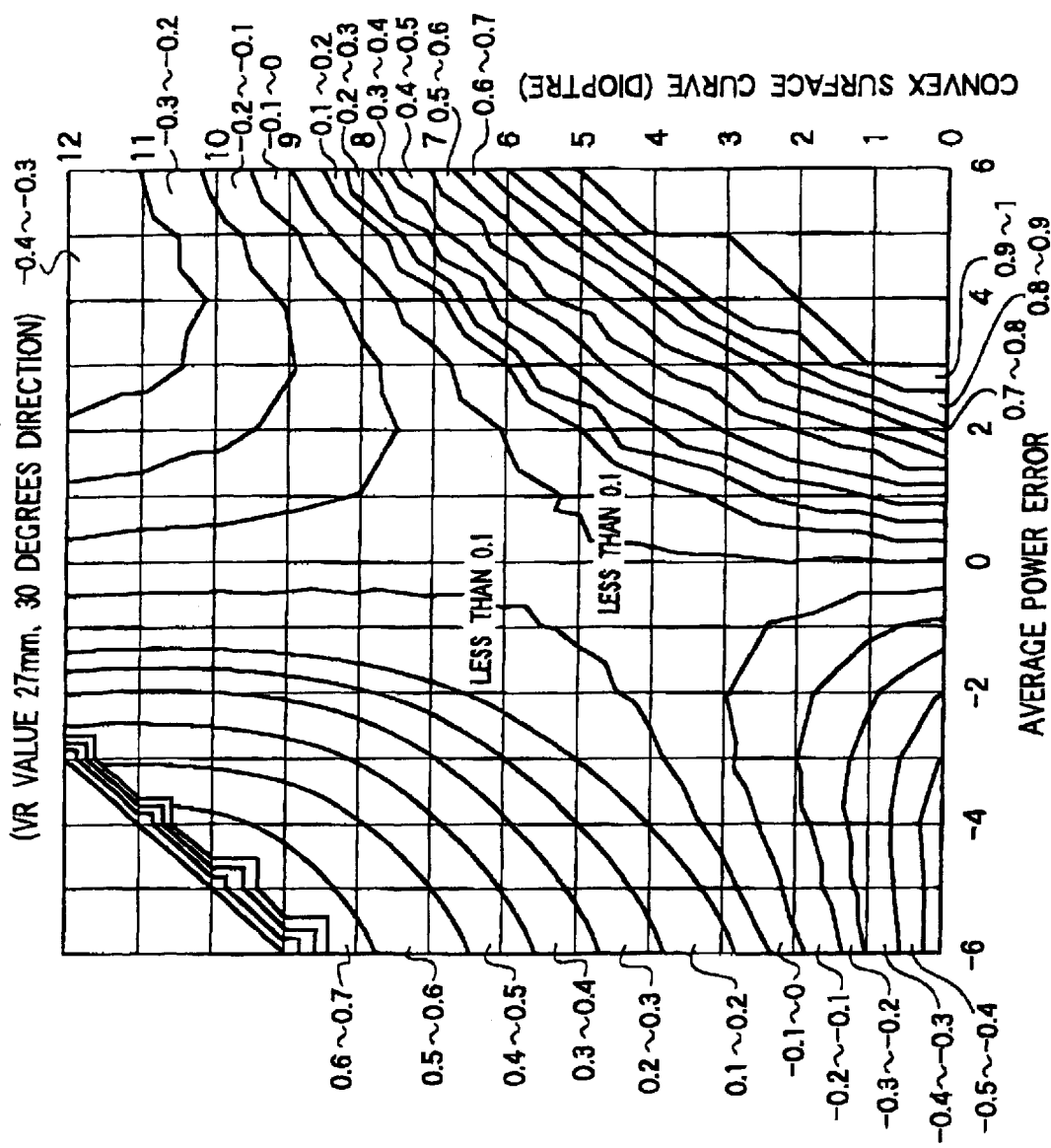
FIG. 16 is a graph for showing the relationships indicated in FIG. 15 as power error contour lines.

FIG. 15 is a table for determining and showing power errors for various combinations of convex surface curve (base curve) values and lens power values in a case in which there is a single vision lens, and the VR value is set at 27 mm, and FIG. 16 is a graph for showing the relationships indicated in FIG. 15 as power error contour lines. Furthermore, the examples shown in these figures are examples that treat the visual line direction as a 30 degree direction. Further, in FIG. 16, the vertical axis is convex surface curves (base curves), and the horizontal axis is lens powers. From this table, it is clear that if a person with a lens power of −6.00 (D) selects a base curve of 2 (D), he will be able to achieve a lens with a good design that has a small power error.

Figure 18:
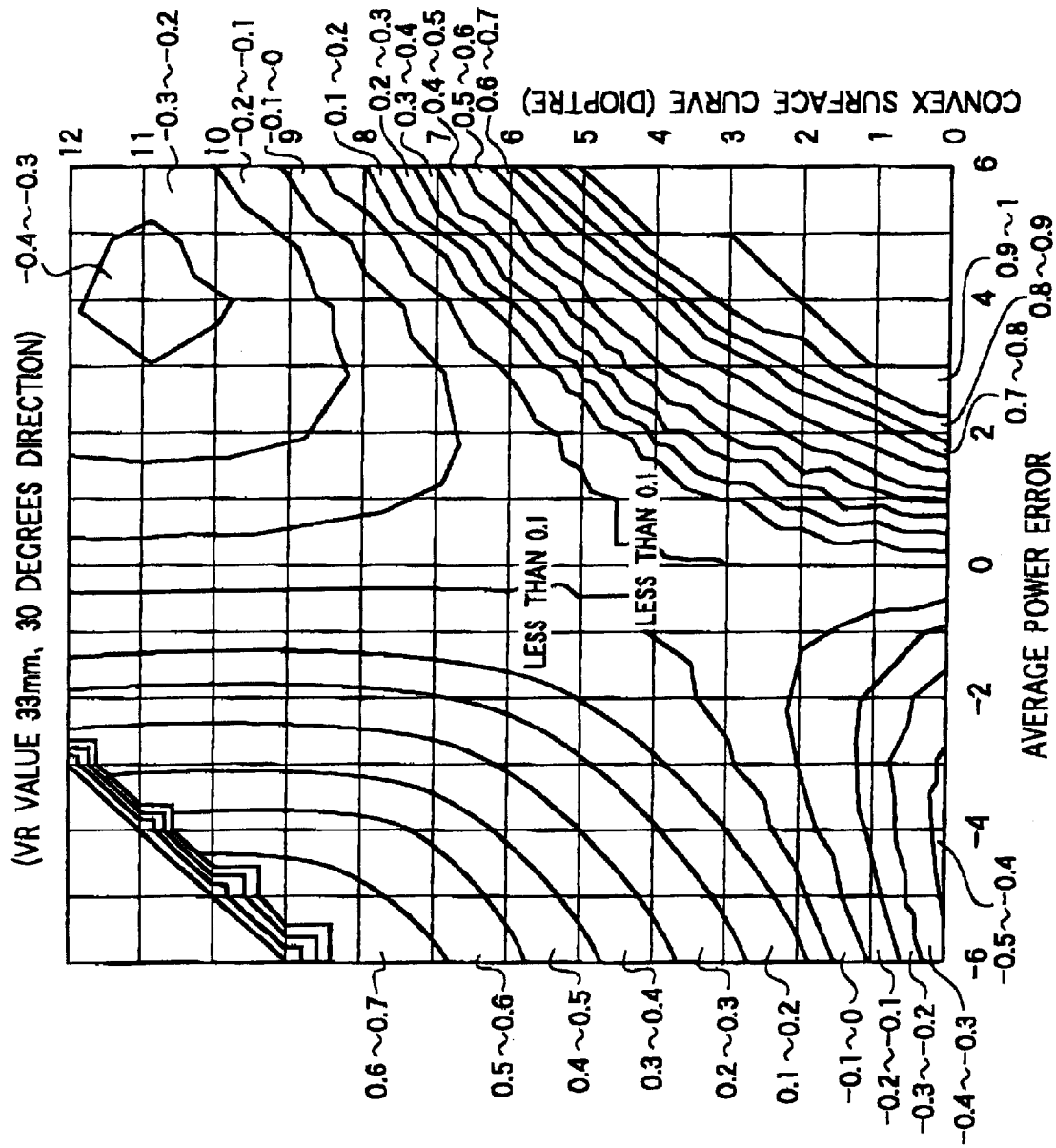
FIG. 18 is a graph for showing the relationships indicated in FIG. 17 as power error contour lines.

FIG. 17 is a table for determining and showing power errors for various combinations of convex surface curve (base curve) values and lens power values in a case in which there is a single vision lens, and the VR value is set at 33 mm, and FIG. 18 is a graph for showing the relationships indicated in FIG. 17 as power error contour lines. The examples shown in these figures are examples that treat the visual line direction as a 30 degree direction. Further, in FIG. 18, the vertical axis is convex surface curves (base curves), and the horizontal axis is lens powers. From this table, it is clear that if a person with a lens power of −6.00 (D) selects a base curve of 1 (D), he will be able to achieve a lens with a good design that has a small power error.

From the above-mentioned results, it is clear that, compared to a case in which the VR value is 27 mm, when the VR value constitutes 33 mm, there is need for a lens with a power that is higher by −0.098 diopter. That is, in the above-mentioned examples, when the VR value changes from 27 mm to 33 mm, a lens that has strong power in terms of an absolute value is needed. The power correction value under the same conditions as mentioned above is a −0.098 diopter, that is, a −4 diopter (27 mm) lens is corrected, and must become a −4.098 diopter (33 mm) lens. Conversely, with regard to lens curve, when the VR changes from 27 mm to 33 mm, looking at the pertinent places in FIG. 15, and FIG. 17, it can be seen that a curve, which has practically no aberration at a D=−4 diopter is a roughly 3.3 curve for VR−27 mm, and is a roughly 2.3 curve for VR=33 mm. That is, in accordance with the difference in VR, the lens curve undergoes bending, and a roughly 1 curve shallower curve is used. The effects of using a VR value, and performing lens design can be recognized here as well. Furthermore, in a case in which a single-vision spectacles exclusively for near use is required for the purpose of near work, it is desirable, of course, to use a near PD, and to use a near VR value.

Next, a case of a progressive-power lens will be explained. The design of a progressive-power lens is basically the same as that for a single vision lens, but from the standpoint of the structure thereof, there are also points that differ. Hereinbelow, the importance of a method for determining (correcting) the inset of a layout for a near portion will be explained while referring to FIG. 19 through FIG. 25.

A progressive-power lens is constituted from a distance portion for long distance vision, a near portion for short distance vision, and an intermediate portion for intermediate vision, which smoothly connects the distance portion and the near portion. From the standpoint of lens design, a spheric design is generally used for the distance portion and near portion (but there are also aspheric designs), and an aspheric design is used for the intermediate portion. Therefore, from the standpoint of design, it can be said that a progressive-power lens has a surface, which combines the spheric design of the above-mentioned single vision lens with an aspheric design.

Further, since a progressive-power lens is a lens for presbyopia, the portion from the intermediate portion to the near portion receives the most noticeable affects resulting from a difference in VR, and in this embodiment, the layout state thereof will be explained by focusing on the near portion thereof.

First, the aspect of designing a progressive-power lens, which constitutes the basis for this embodiment, will be explained. Furthermore, since the designs for a progressive refracting surface itself are diverse, and various are capable of being used, in this embodiment, the basic structural portion will be explained.

The progressive-power lens of this embodiment is constituted such that lens is designed based on a prescribed optical design concept, the basic progressive retracting surface thereof is set as a functionalized surface via a prescribed numerical expression in a lens design program, and a prescription lens surface can be set up by inputting prescribed form determining element parameters, such as prescribed dioptric power. (Since lens design systems, which express a lens surface as a functionalized surface, and make use of programmed computers, have become well-known in recent years in particular (for example, WO98/16862), in this embodiment, a detailed explanation in particular of the design methods thereof will be omitted.)

Further, for the basic progressive refracting surface thereof, a lens surface is set up by determining the power distribution across an entire lens surface of a distance portion, a intermediate portion, and a near portion. And then, as elements for determining the power distribution thereof, there are the base curve value of a distance portion, addition, horizontal power distribution of a distance portion and a near portion, the layout of a distance portion, near portion, and intermediate portion, progressive zone power change distribution, positioning of either a principal meridian or a principal sight line, positioning of astigmatism distribution, and positioning of average power distribution. And then, a prescribed progressive refracting surface is set up by adding weighting to, and changing the weighting of these elements in accordance with individual design concepts. As precedents for the design thereof, it is possible to cite specifically, for example, Japanese Patent Application Laid-open No. S57-210320, Japanese Patent Application Laid-open No. H8-286156, and Japanese Patent Application Laid-open No. H9-90291, which are related to applications of the applicants of this case.

And then, a progressive-power lens created based on a certain prescribed design concept like this, a basic progressive refracting surface, comprising a plurality of base curves (for example, 2–8 curves) in accordance with the prescribed dioptric power thereof, is prepared beforehand. And a standard near portion inset INSET0 is set as an initial value (for example, 2.5 mm) in each.

Figure 25:
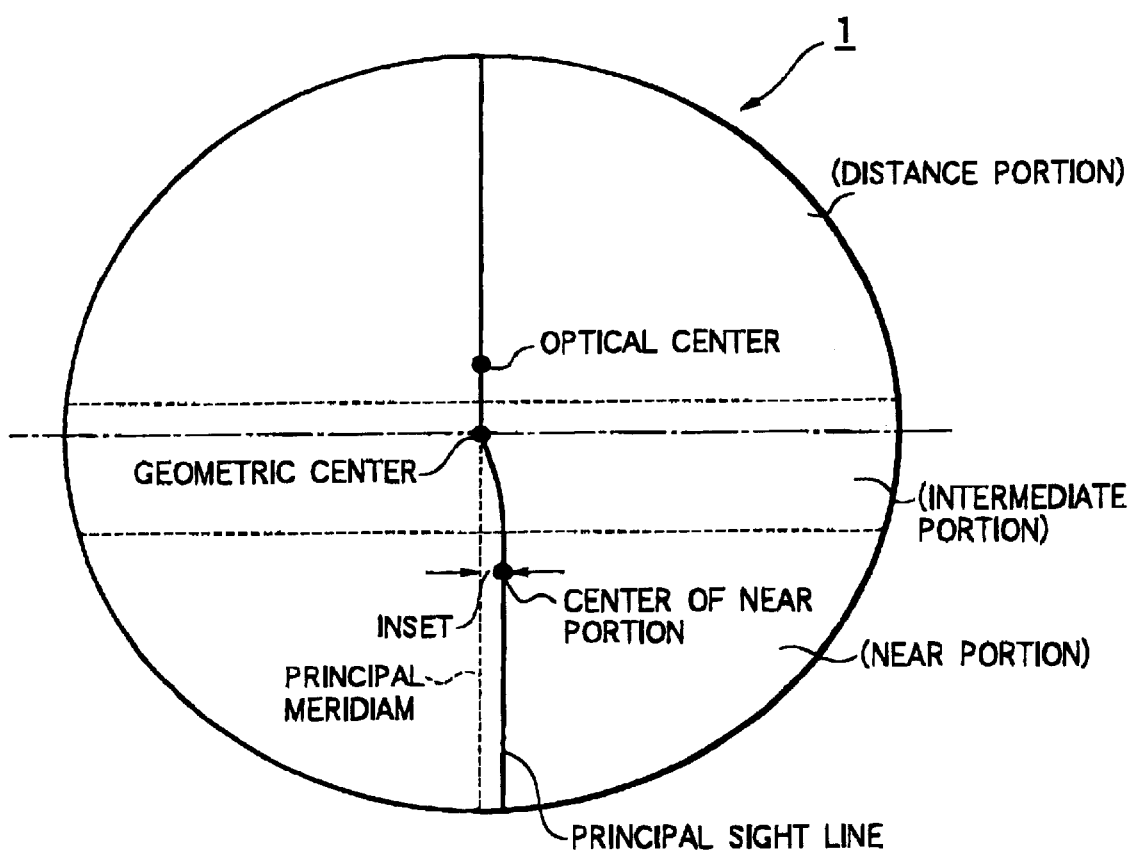
FIG. 25 is a schematic diagram of a progressive-power lens.

The near portion inset thereof is an inset toward the inner side of the near portion, which is set on a basic progressive refracting surface by treating as a reference a passage point on front surface of the lens of a line of sight at distance forward viewing (for example, a point on the principal meridian of a progressive-power lens), and is the distance in the horizontal direction from the principal meridian to the center of near portion of a progressive-power lens (Refer to FIG. 25).

From among the above-mentioned plurality of base curves, a basic progressive refracting surface of a prescribed base curve that corresponds to the prescribed dioptric power (for example, a 7 curve in the case of ADD 2.00 with a SPH +3.00 diopter) is selected, and an initial value of INSET0 is set in the near portion of the basic progressive refracting surface thereof.

Next, this basic progressive refracting surface is treated as a front surface, and a lens design program is used to determine the form and location (a relative location on the optical axis relative to the front surface) of a back surface of the lens, such that the lens thereof satisfies the power as prescribed (comprising a prism in a case in which a prism prescription is necessary).

Preferably, a back surface of the lens to set at this time, such that the thickness of the lens thereof is made thinnest owing to frame shape, type of frame, and layout of lens relative to frame. Because methods for determining a back surface of the lens having an optimal thickness like this are being implemented in the spectacles industry in lens ordering system thereof, and are well-known technologies (for example, Japanese Patent Application Laid-open No. S59-55411, the HOYA METS system, and so forth), an explanation thereof will be omitted for this embodiment.

Next, since the form and location of both a convex surface and a concave surface of the lens, which constitutes a reference, are determined, a ray tracing method is used on the lens thereof, and the location of the near portion is determined.

In this case, as shown in FIG. 3, to accurately determined the inset of the near portion, a provisional optical model of a wearing state is set up on the basis of a prescribed near side object distance (working distance for near vision: a target distance for work to be done at a short distance) and the locations of the right and left eyes, a VR number of the invention of this case, which is obtained by measuring each individual spectacles wearer, distance PD, frame data, and frame forward tilt, and ray tracing computations are performed.

That is, the location of a point at which the visual line passes through the front surface of the lens when the right and left eyes actually identify a near object is determined via simulations based on the above-mentioned optical model, and next, a horizontal direction constituent (INSET1: the horizontal distance from the principal meridian to the center of near portion of the lens), which is the inset when there is convergence from the visual line in distance vision to the visual line in near vision in the location thereof, is determined.

Figure 19:
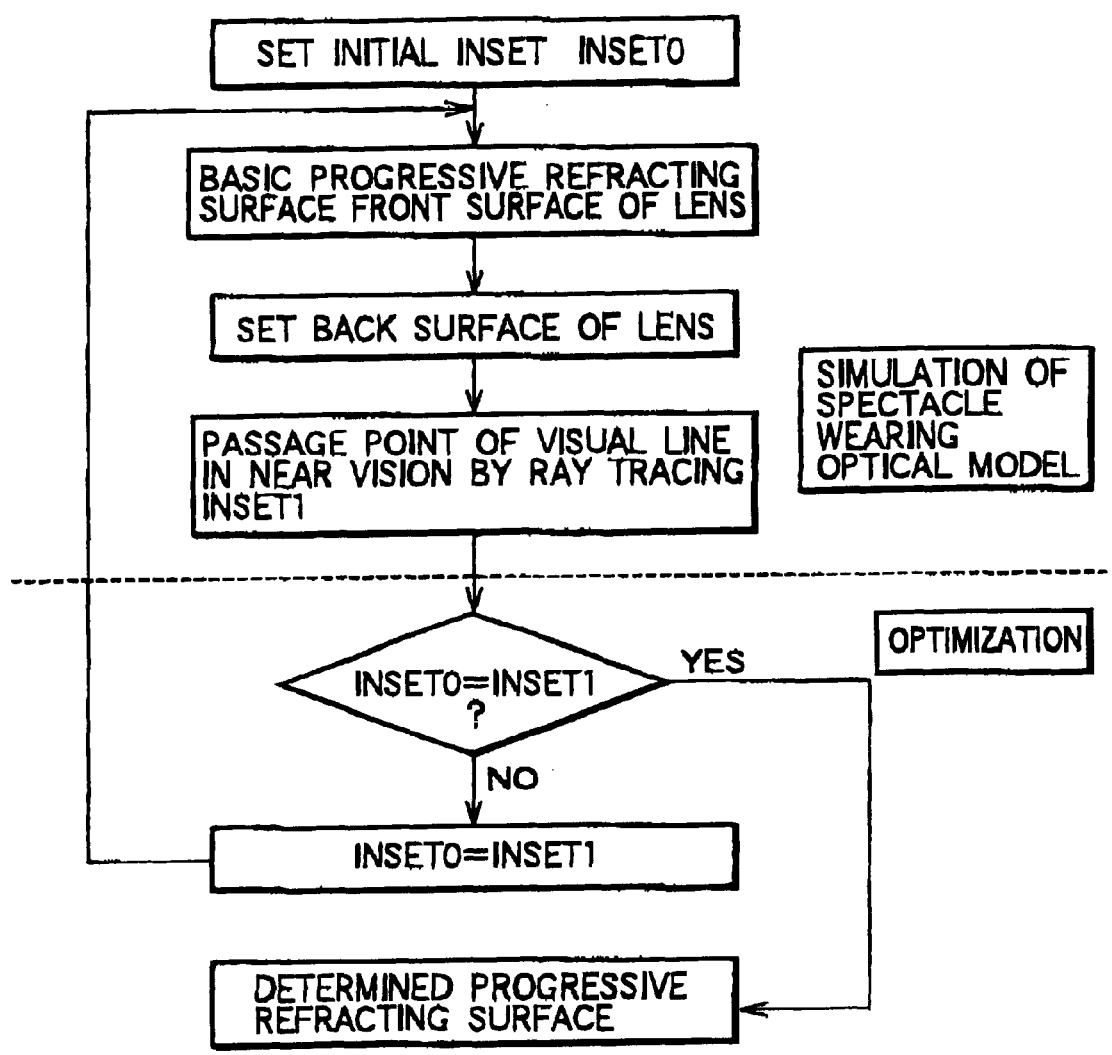
FIG. 19 is a flowchart showing design procedures for a progressive-power lens.

Next, a determination is made as to whether or not the initial inset value INSET0, which was set in the basic progressive refracting surface, is identical to the first inset INSET1, which was determined here. When INSET0 and INSET1 are not identical, the value of INSET0, which was provided as an initial value, is replaced by the value of INSET1. And then, as shown in the flowchart of FIG. 19, the newly replaced inset (INSET1) to reset once again in the near portion of the basic progressive refracting surface, simulation is performed for the new progressive surface, for which the near portion optical layout has changed, and the above-mentioned processing is repeated.

Figure 24:
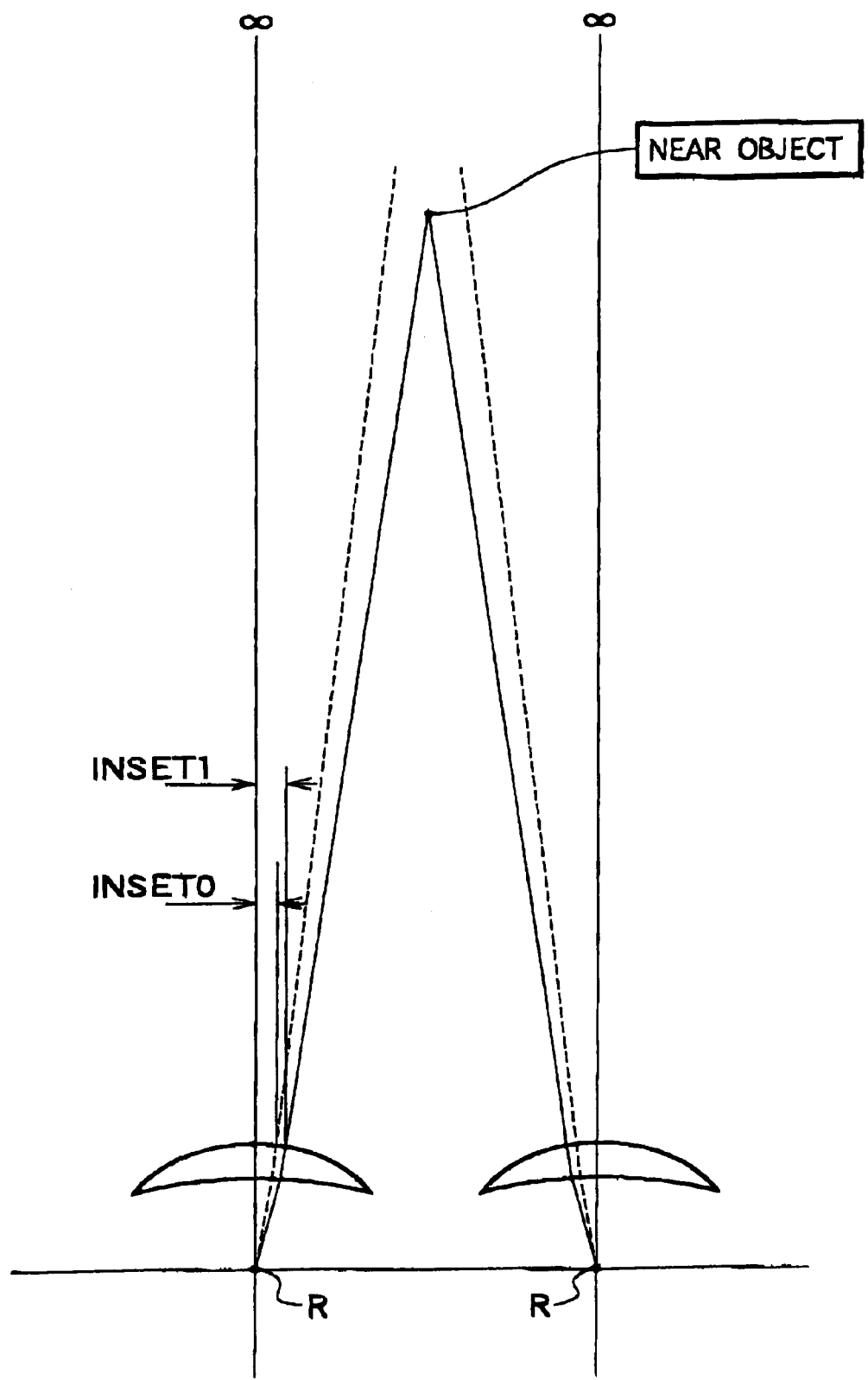
FIG. 24 is a diagram illustrating the divergence of the visual line between INSET0 and INSET1.

In general, an inset is rarely determined by the initial ray tracing. This is because an optical model is changed by a change in the VR value, and the visual line location on a lens in a spectacles wearing state, and the visual line location on a lens when looking at a near object in accordance with a prescription power and prism change greatly. FIG. 24 is a diagram illustrating the divergence of the visual line between INSET0 and INSET1. This divergence is due to the fact that a line of sight passing through a lens on its way toward a near object is refracted by the lens, and the visual line actually passes through a location that differs from INSET0, which was set as a standard inset.

That is, the optical layout of the near portion changes in accordance with the changing of the inset, and to deal with this, the intermediate portion and distance portion are also changed, and a new progressive refracting surface is created while maintaining the basic refraction design surface, and then, an ideal inset is sought, and optimization is performed until optical conditions are satisfied such that the visual line in near vision is able to pass through a prescribed near object distance. Then, when INSET (n−1)=INSET (n), the repetitive processing thereof (optimization) is completed, and a progressive refracting surface and back surface of the lens are determined as the final prescription lens.

Especially in a case in which ray tracing is performed on a lens comprising a plurality of surface forms like a progressive refracting surface, it is necessary to determine a correct inset by repetitive processing like this so that INSET (n−1)=INSET (n) can be achieved. Next, an example in which the above-mentioned inset optimization is implemented will be explained based on the figures.

FIG. 20-1, FIG. 20-2, and FIG. 20-3 are design examples of progressive refracting surfaces of progressive-power lenses with addition 2.00 D, when, as a condition, VR=27.0 mm is provided as a standard value.

At this time, the refractive index of a lens material is 1.596, the length of the progressive zone from the distance portion to the near portion is 15 mm, and progressive refracting power increases, having a location 4 mm upwards from the center as a base point, and achieves addition 2.00 D at a location 11 mm downward from the center. The PD of the right and left eye is 32.0 mm in both the right and left, and the near object distance is set at 33.3 cm.

Each diagram is a distribution of surface astigmatism, and surface average power for each progressive refracting surface, and shows a distribution range of $\phi$80 mm. Further, a $\phi$50 mm auxiliary circle is placed on the inside portion.

Figures 1, 20:
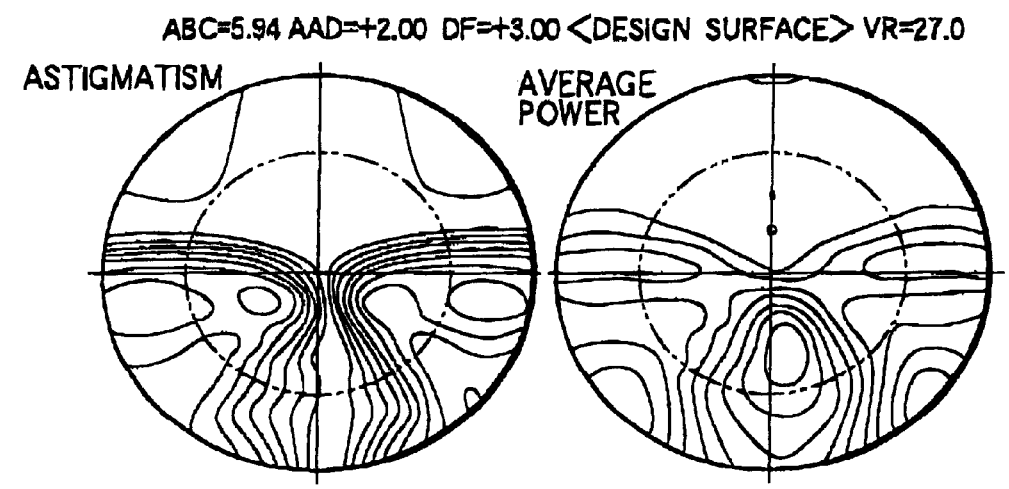
Figures 2, 20:
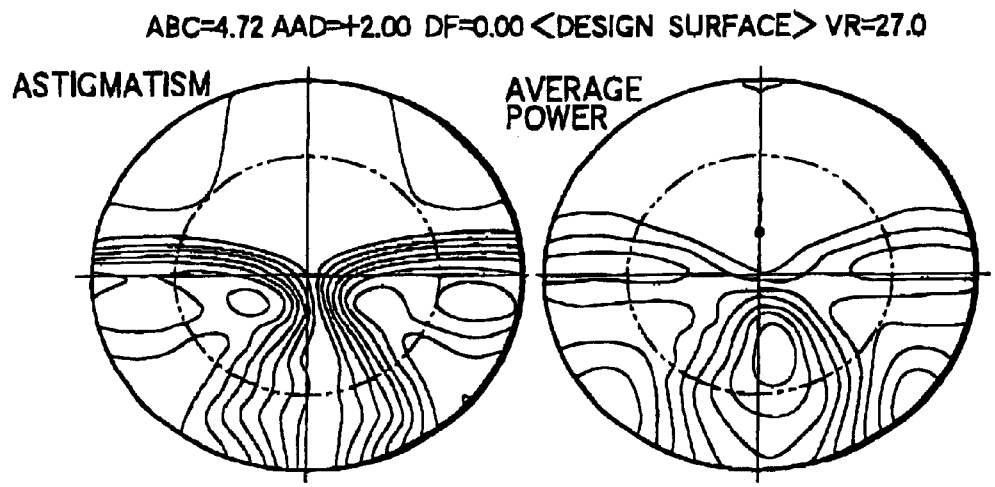
Figures 3, 20:
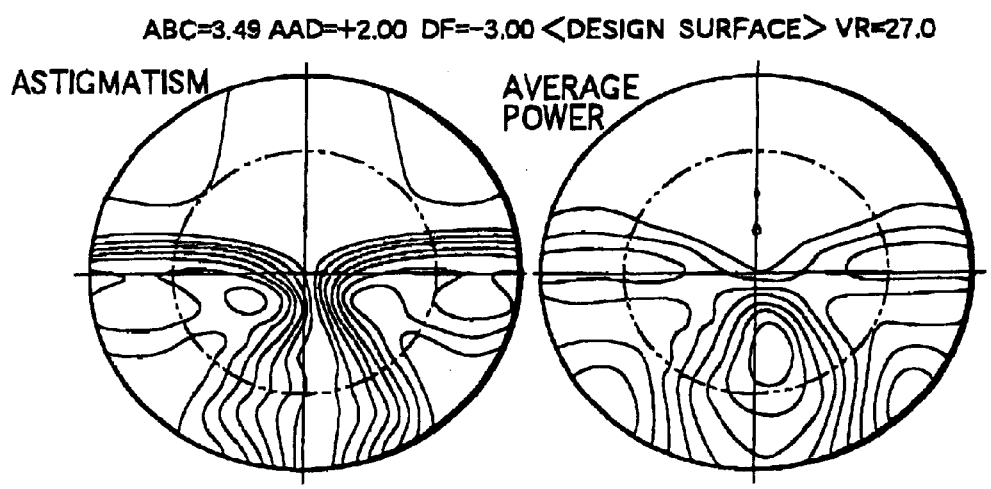

FIG. 20-1 is a progressive refracting surface form for which the distance power (DF) for both the right and left is set at +3.00D, the convex curve (ABC) is set at 5.94D, lens thickness at the geometric center is set at 5.1 mm, and the prism at the geometric center is set at 1.0Δ base 270°, FIG. 20-2 is a progressive refracting surface form for which the distance power (DF) for both the right and left is set at 0.00D, the convex curve (ABC) is set at 4.72D, center thickness is set at 2.7 mm, and the prism is set at 1.0Δ base 270°, and FIG. 20-3 is a progressive refracting surface form for which the distance power (DF) for both the right and left is set at −3.00D, the convex curve (ABC) is set at 3.49D, center thickness is set at 1.5 mm, and the prism is set at 1.0Δ base 270°.

Looking at the distributions of astigmatism and average power in the vicinity of the near portions of these FIG. 20-1, FIG. 20-2, and FIG. 20-3, it is clear that the positioning of a near portion changes in accordance with differences in distance power (DF). In accordance with differences of −3.00D, 0.00D, +3.00D in distance power (DF), the insets of the near portions sequentially steadily increase. This difference is because the prism effects of the near portions of progressive-power lenses differ mainly due to differences in distance power (DF).

FIG. 21-1, FIG. 21-2, and FIG. 21-3 are design examples of when only the VR value of the design examples of FIG. 20 is treated as a value that is larger than the standard value, and is given as VR=33.0 mm.

FIG. 21-1 is a progressive refracting surface form for which the distance power (DF) for both the right and left is set at +3.00D, the convex curve (ABC) is set at 5.94D, center thickness is set at 5.1 mm, and the prism is set at 1.0Δ base 270°, FIG. 21-2 is a progressive refracting surface form for which the distance power (DF) for both the right and left is set at 0.00D, the convex curve (ABC) is set at 4.72D, center thickness is set at 2.7 mm, and the prism is set at 1.0Δ base 270°, and FIG. 21-3 is a progressive refracting surface form for which the distance power (DF) for both the right and left is set at −3.00D, the convex curve (ABC) is set at 3.49D, center thickness is set at 1.5 mm, and the prism is set at 1.0Δ base 270°.

In the case of these FIG. 21-1, FIG. 21-2, and FIG. 21-3 as well, the same as the case of FIG. 20, the positioning of a near portion changes in accordance with differences in the distance power (DF), but it is clear that the insets of the near portions are larger in the case of FIG. 21 than the case of FIG. 20 for all the distance power s (DE). This difference is because the location at which the visual line passes through a progressive-power lens when looking at a near object differs greatly according to differences in VR in addition to differences in distance power (DF).

FIG. 22-1, FIG. 22-2, and FIG. 22-3 are design examples of when only the VR value of the design examples of FIG. 20 is treated as a value that is smaller than the standard value, and is given as VR=20.0 mm.

Figures 1, 22:
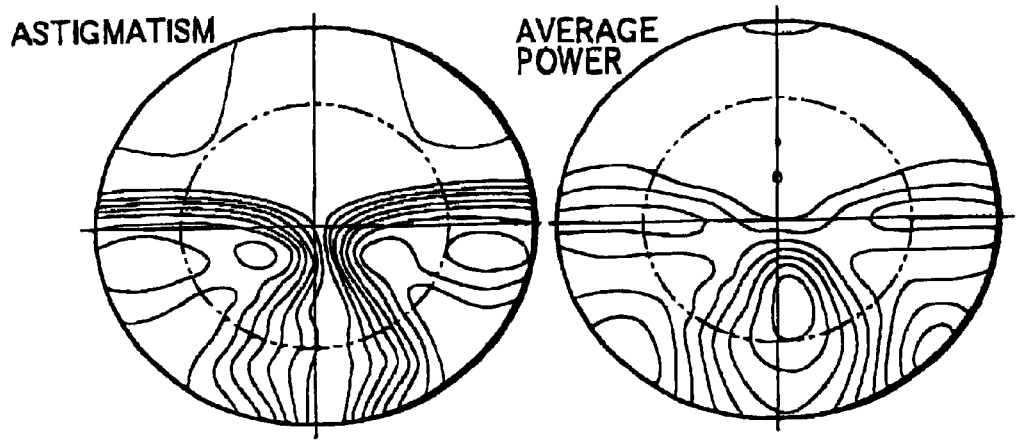
Figures 2, 22:
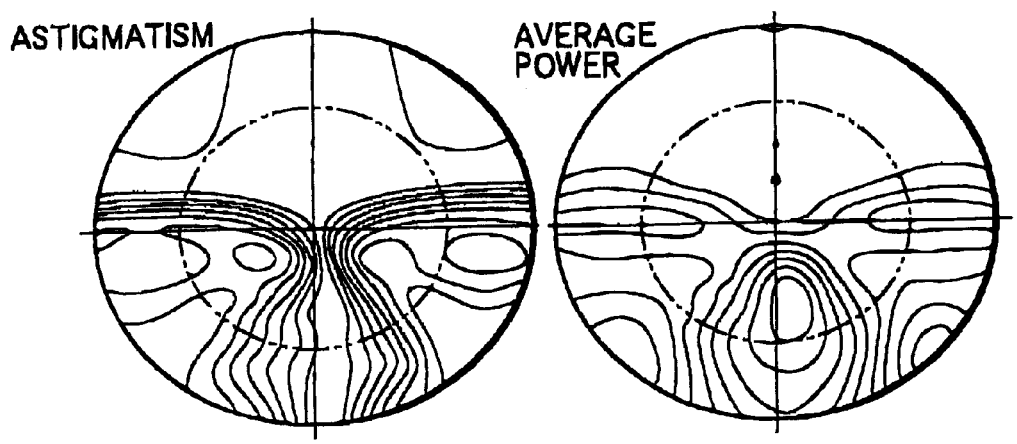
Figures 3, 22:
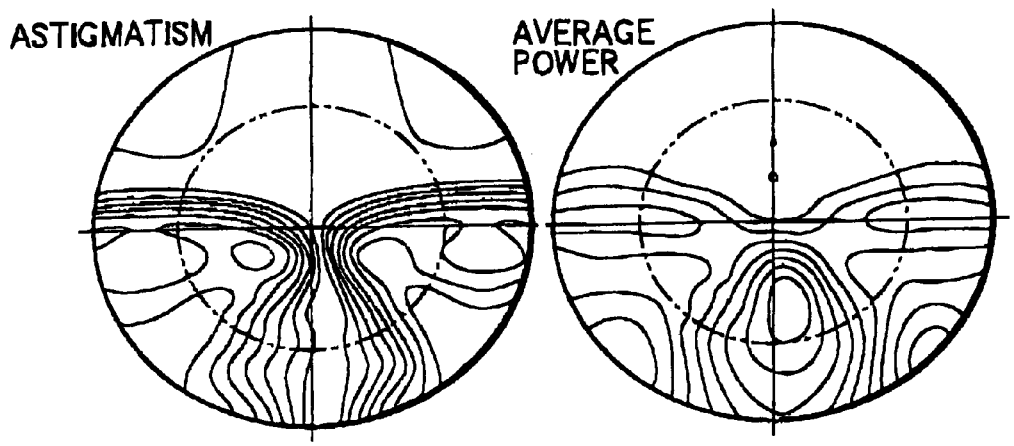

FIG. 22-1 is a progressive refracting surface form for which the distance power (DP) for both the right and left is set at +3.00D, the convex curve (ABC) is set at 5.94D, center thickness is set at 5.1 mm, and the prism is set at 1.0Δ base 270°, FIG. 22-2 is a progressive refracting surface form for which the distance power (DF) for both the right and left to set at 0.00D, the convex curve (ABC) is set at 4.72D, center thickness is set at 2.7 mm, and the prism is set at 1.0Δ base 270°, and FIG. 22-3 is a progressive refracting surface form for which the distance power (DF) for both the right and left is set at −3.00D, the convex curve (ABC) to set at 3.49D, center thickness is set at 1.5 mm, and the prism is set at 1.0Δ base 270°.

In the case of these FIG. 22-1, FIG. 22-2, and FIG. 22-3 as well, the same as the cases of FIG. 20 and FIG. 21, the positioning of a near portion changes in accordance with differences in the distance power (DF), but it is clear that the insets of the near portions are smaller in the case of FIG. 22 than the case of FIG. 20 for all the distance power s (DF), and compared to FIG. 21, the insets of FIG. 22 are extremely smaller. This difference, too, is because the location at which the visual line passes through a progressive-power lens when looking at a near side object differs greatly according to differences in VR in addition to differences in distance power (DF) the same as the case of FIG. 21.

FIG. 23 shows the results of calculating as specific numerals the near portion insets INSET provided to the respective determined progressive refracting surfaces shown in FIG. 20, FIG. 21, and FIG. 22. From this it is clear that the insets of the near portions change in accordance with differences in VR.

Figure 26:
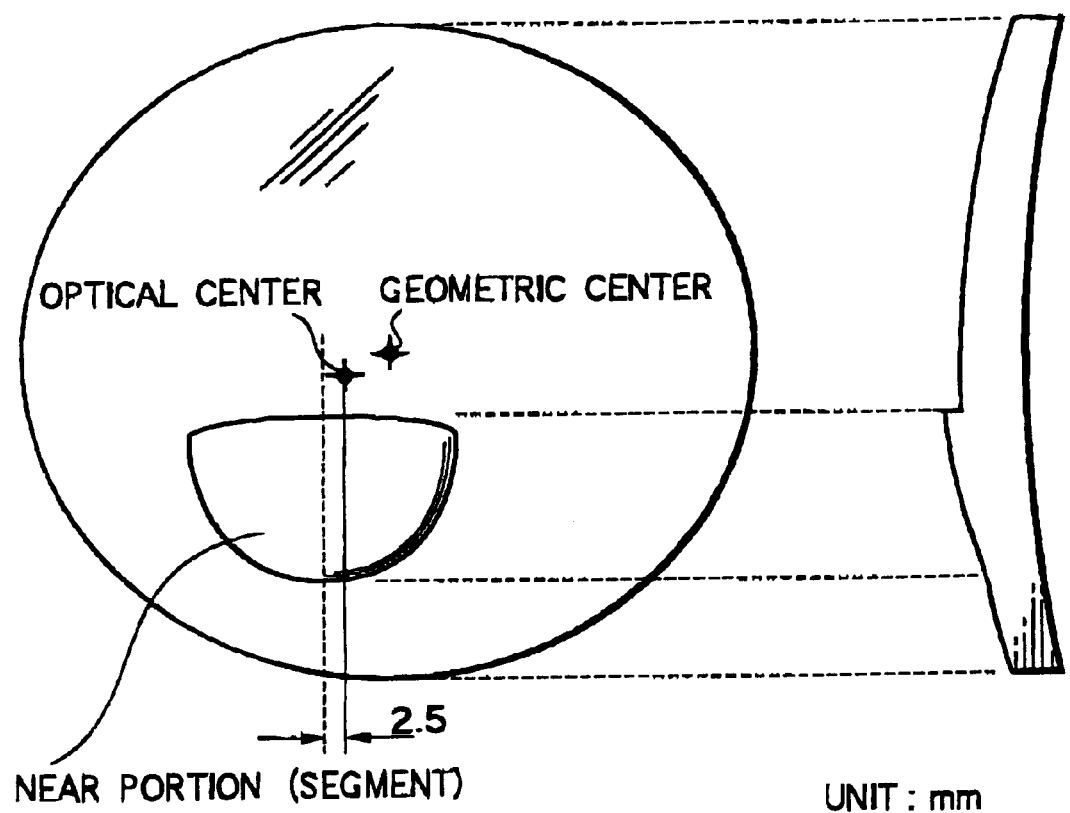
FIG. 26 is a schematic diagram of a bifocal lens.
Figure 4:
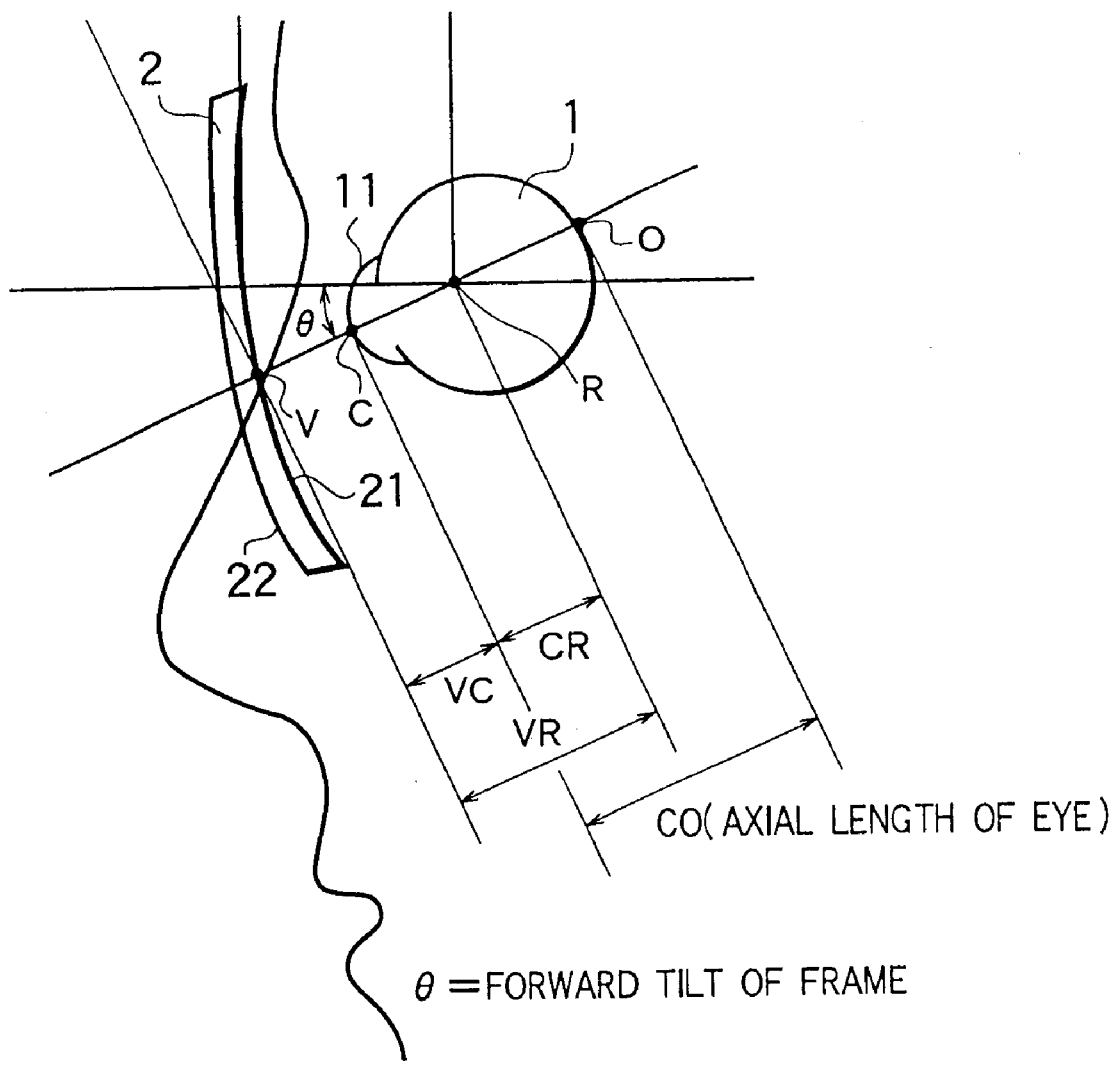

It is desirable for this to be performed in accordance with the lenses of the left and right eyes. Further, this method can also be used in the same way in a case in which the optical layout of the near portion of a bifocal (segment height, left-right location, and so forth) is determined, and a prescription lens is determined. That is, as shown in FIG. 26, since the near segment portion of a bifocal layout block is partitioned by a boundary line, the location of the near portion is adjusted in the same manner as the above-mentioned example of a progressive-power lens.

Further, in addition to an inset of a near portion, astigmatism, average power error, and distortion can also be determined from ray tracing for either a selected basic progressive refracting surface, or a corrected progressive refracting surface and a back surface of the lens in the flowchart of FIG. 19.

Thus, when optimizing the inset of a near portion, the form of a progressive refracting surface can be corrected, and aberration correction can be performed simultaneously from such values as astigmatism, average power error, and distortion determined by ray tracing.

In correcting the aberration of a progressive refracting surface by optimization, optimization is performed beforehand for a basic progressive refracting surface so as to diminish the respective deviations (ΔA1, ΔB1, ΔC1) between estimated astigmatism A0, average power distribution B0 and distortion C0, and astigmatism A1, average power distribution B1 and distortion C1 determined by ray tracing. Weighting, which corresponds to a location on a basic progressive refracting surface (center area, lateral area, distance portion, near portion, and so forth), is performed for each of the deviations thereof at this time. At this time, ray tracing is performed, and optimization is performed in the respective areas by using in the distance portion a VR value that differs at distance vision and at near vision. Furthermore, for the intermediate portion, two VR values are interpolated and used at distance vision and near vision in accordance with a localized additional refracting power in the location thereof.

Further, depending on the lens design, it is also possible to use a partial VR value for either only a distance portion, or only a near portion.

The results thereof are displayed using, for example, an astigmatism diagram, bird's-eye view, and so forth, by a display processing program for optical performance computation results provided in a lens design program, and are constituted so as to enable comparison and study. Further, such results are set up to also be displayable on the personal computer of the ordering party via a communications line. The spectacles store side either confirms or selects a desired lens based on such results. Naturally, wearing parameters can be changed, new wearing conditions can be set, and a new prescription lens can be determined based on the simulation data thereof.

As for the results thereof, there is performed, based on information of each type sent to a host computer by a display processing program for optical performance computation results provided in a lens design program, computations to determine how a spectacle lens of the individual design that is being ordered differs from a standard spectacle lens, the results thereof are returned to a spectacle store side terminal apparatus, and the differences therebetween can also be displayed thereon. A standard lens to be used as a comparison object can also be specified by the spectacles store side at this time, and in a case in which there is no specification of a standard lens as a comparison object, this embodiment is constituted such that a lens set in the host computer beforehand is treated as the comparison object. Based on such results, the spectacles store side can check the differences between a desired individual designed lens and a standard lens.

A number of methods can be cited for comparing the differences between a spectacle lens of an individual design, and a standard spectacle lens. One method is a method in which the kind of aberration distribution achieved when the end user puts on the spectacles thereof is determined by ray tracing, and the results thereof are displayed on the spectacles store side terminal apparatus by lining up the aberration distribution of the standard spectacles beside the aberration distribution of the individually designed spectacles.

For example, if it is a single-vision aspheric lens, there is a method, which displays the power error and astigmatism of each angle of visual line to the lens concave surface. Even in the case of a progressive-power lens, there is a method, which displays as the aberration distribution of an entire lens surface via contour lines the distribution of astigmatism and average power of each angle of visual line toward the lens concave surface.

Further, as a simplified comparison method, there is a method such as the following. There is a method, which, in the case of a single-vision aspheric lens, compares and displays using numerals and graphs a power error and astigmatism of when there is a 30 degree angle of visual line toward the lens concave surface, and the lens convex surface curve at the design center location of a spectacle lens of an individual design, and a standard spectacle lens, respectively. For a progressive lens, too, there is a method, which compares and displays using numerals and graphs astigmatism and average power in the 8 directions of upwards, downwards, inwards, outwards, diagonally inwards upwards, diagonally outwards upwards, diagonally inwards downwards, and diagonally outwards downwards at a 30 degree angle of visual line toward a lens concave surface, and a lens convex surface curve in the respective design center locations. Furthermore, it is desirable that price, delivery time and other such information also be included.

(Lens Manufacturing)

Next, when order receipt of the above-mentioned prescription lens is determined by an order, the processing data thereof is prepared. This processing data is prepared on the basis of a lens processing program. Processing conditions of processing equipment are determined, driving of processing equipment is controlled, and instructions are given for selecting processing tools and for selecting a lens material by processing data. This processing data are sent to each manufacturing equipment in a factory with processing instructions.

And then, at the manufacturing site, a lens blank is selected based on the processing instructions, and cutting and grinding lens processing are performed using an NC cutting machine. Also in a case in which surface processing (formation of a wear-resistant hard coating, formation of an anti-reflection coating, lens tinting, water repellant processing, formation of an ultraviolet ray cutting coating, anti-fogging treatment, and so forth) is required, processing is performed here. Then, a round shaped prescription lens is completed. Further, at this point, there are also cases in which a lens can be selected from finished products stocked beforehand for lens manufacture.

Next, the above-mentioned round lens is made to correspond to a prescribed lens form, and a bevel (V-shaped edge) is formed at the edge based on spectacles layout information. The formation of the bevel is performed by a machining center. This processing is performed using a tool and processing method disclosed in Japanese Utility Model Application Laid-open No. H6-17853, and Japanese Patent Application Laid-open No. H6-34923, which are related to the above application of this applicant. Here, too, selecting of type of lens material (glass, plastic, polycarbonate, acrylic, and so forth), selecting of frame material, inputting of frame PD (FPD, DBL), inputting of PD (both eyes, one eye), inputting of horizontal decentration distance X, inputting of vertical decentration distance Y, inputting of astigmatism axis, inputting of finished size, and specifications of bevel shape are used as processing conditions, and when the processing equipment is set to the processing mode, the input data thereof is automatically introduced by a program.

And then, when these prescribed items are set, and the start switch is pressed, edge planing and bevel formation are automatically performed at the same time. A bevel formed lens is manufactured in this manner, passes through an inspection process at the factory, and is shipped to a spectacles store. At the spectacles store, the bevel formed lens is fitted into a selected frame, and spectacles are assembled. Further, in this embodiment, the bevel formation was explained as an aspect, which is implemented by a manufacturer, but this can also be performed at a spectacles store, and is not particularly limited to the manufacturing flow of this embodiment.

Based on the above-mentioned results, good spectacles can be obtained by selecting an appropriate base in accordance with a VR value. Furthermore, with regard to a lens optical performance evaluation index, average power was utilized in the above-mentioned aspect of the embodiment, but it is not limited thereto. There are indices such as astigmatism, average power error, distortion, spectacles magnification, RMS, and combinations thereof, and the index is not particularly limited. Further, a lens design program, inquiry-based simulation program, display program and so forth can be incorporated beforehand into an ordering party terminal and accessory equipment (CD or the like), and can also be run on the same personal computer in the sense of an apparatus having a kind of information processing function.

As explained hereinabove, the present invention makes it possible to design and manufacture a higher performance spectacle lens that accords with the VR value (VC+CR) of each individual person by determining, by measuring each individual spectacles wearer, a value for the distance VR from a reference point on the back surface of a spectacle lens to the center of rotation of the eye, which adds a value for the distance VC from a reference point on the back surface of a spectacle lens when spectacles are being worn to the vertex of the cornea of a spectacles wearer's eyeball, which is one of the required data in spectacle lens design, and a value for the distance CR from the above-mentioned cornea vertex to the center of rotation of the eye, using the value thereof to perform spectacle lens design, and to manufacture a spectacle lens on the basis of the design specifications thereof.

As explained hereinabove, this spectacle lens and manufacturing method therefor makes it possible to supply a spectacle lens that excels in feeling when wearing it by designing and manufacturing a spectacle lens taking into consideration the distance between the center of rotation of the eye and the spectacle lens for an individual spectacles wearer, and can be applied to any of a single vision lens, a multifocal lens, and a progressive-power lens.

What is claimed is:

1. A spectacle lens, wherein there is determined, by either measurement or specification for an individual spectacles wearer, a value of the distance VR from a reference point on the back surface of a spectacle lens to the center of rotation of the eye, which is given by adding a value of the distance VC from a reference point on the back surface of a spectacle lens to the vertex of the cornea of the eye of a spectacles wearer when spectacles are being worn, which is one of the required data in spectacle lens design, and the distance CR from said cornea vertex to the center of rotation of the eye, which is calculated by measuring the axial length CO of the eye of a spectacles wearer and using a value obtained based on measurement data thereof, and the spectacle lens is designed using the value VR thereof, and is manufactured based on the design specifications.

2. A spectacle lens, wherein a value of the distance VR from a reference point on the back surface of a spectacle lens to the center of rotation of the eye, which is given by adding a value of the distance VC from a reference point on the back surface of a spectacle lens to the vertex of the cornea of the eye of a spectacles wearer when spectacles are being worn, which is one of the required data in spectacle lens design, and the distance CR from said cornea vertex to the center of rotation of the eye, is determined for distance vision, near vision, specified distance vision, and combination thereof, respectively, and the value of the distance VR is either selected and used on the basis of lens optical characteristics, or used for appropriate viewing areas of a spectacle lens, respectively, and the spectacle lens is designed for an individual spectacles wearer using the value thereof and is manufactured based on the design specifications.

3. A spectacle lens, wherein processing is performed by obtaining an optimized lens form based on design and/or processing condition data information selected as needed from among information comprising a prescription value, which comprises spectacle lens information, spectacle frame information, the VR value which is the distance from a reference point on the back surface of a spectacle lens to the center of rotation of the eye of an individual spectacles wearer, and related data on an amount of inset for near vision determined based on said VR value, layout information, and processing specification information.

4. The spectacle lens according to claim 3, wherein a base curve of a convex surface is determined based on said VR value.

5. The spectacle lens according to claim 3, wherein power error correction is performed for a pre-set reference prescription surface based on said VR value.

6. A spectacle lens manufacturing method, wherein a terminal apparatus, which is installed at a spectacle lens ordering party side, and an information processing system, which is installed at a spectacle lens processing party side and is connected by a telecommunications line to said terminal apparatus are provided for designing and manufacturing a spectacle lens based on information sent to said information processing system via said ordering party terminal apparatus, the method comprising the steps of:

sending to said information processing system via said terminal apparatus design and/or processing condition data information selected as needed from among information comprising a prescription value, which comprises spectacle lens information, spectacle frame information, and data related to the VR value which is the distance from a reference point on the back surface of a spectacle lens to the center of rotation of the eye of each spectacles wearer, layout information, and process specification information; and obtaining an optimized lens form based on said information sent by said information processing system, determining processing conditions, and manufacturing a spectacle lens.

7. A spectacle lens manufacturing method, wherein a terminal apparatus, which is installed at a spectacle lens ordering party side, and an information processing system, which is installed at a spectacle lens processing party side and is connected by a telecommunications line to said terminal apparatus are provided for designing and manufacturing a spectacle lens based on information sent to said information processing system via said ordering party terminal apparatus, the method comprising the steps of:

sending to said information processing system via said terminal apparatus design and/or processing condition data information selected as needed from among information comprising a prescription value, which comprises spectacle lens information, spectacle frame information, and data related to the VR value which is the distance from a reference point on the back surface of a spectacle lens to the center of rotation of the eye of each spectacles wearer, layout information, and process specification information;

determining an optimized lens form based on said information sent by said information processing system;

also determining a standardized lens form by said information processing system using a standardized VR value in place of said VR value obtained for each spectacles wearer, while using other design and/or processing condition data sent via said terminal; and comparing the optical characteristics of said optimized lens form with the optical characteristics of said standardized lens form, and based on the results of the comparison, selecting either one of said lens forms, determining processing conditions of this selected lens form, and manufacturing a spectacle lens.

8. A spectacle lens manufacturing method, wherein a spectacle lens is designed and manufactured while information is exchanged between a terminal apparatus, which is installed at a spectacle lens ordering party side, and a manufacturing side computer, which is connected to the ordering side computer to enable information exchange; the method comprising the steps of:

inputting via said terminal apparatus design and/or processing condition data information selected as needed from among information comprising a prescription value, which comprises spectacle lens information, spectacle frame information, and data related to the VR value of a spectacles wearer, layout information, and process specification information, and obtaining an optimized lens form based on an optical model of wearing conditions simulated on the basis of the inputted information, determining processing conditions, and manufacturing a spectacle lens.

9. The spectacle lens according to claim 1, wherein said center of rotation of eye is determined for distance vision, near vision, specified distance vision, and combination thereof, respectively, and is either selected and used on the basis of lens optical characteristics, or is used for appropriate viewing areas of a spectacle lens, respectively.

* * * * *

UNITED STATES PATENT AND TRADEMARK OFFICE
CERTIFICATE OF CORRECTION

PATENT NO.    : 6,637,880 B1
DATED         : October 28, 2003
INVENTOR(S)   : Tetsuma Yamakaji et al.

It is certified that error appears in the above-identified patent and that said Letters Patent is hereby corrected as shown below:

<u>Drawings,</u>
Please substitute attached Fig. 4 for Fig. 4. Sheet 4, Fig. 4, the axial length of eye CO should only extend to the line extending from the vertex C.

<u>Column 10,</u>
Line 15, after the sentence ending with "to around 44 millimeters." add, -- In FIG. 4, O is the point of intersection of the eye axis and the retina. --

Signed and Sealed this

Sixteenth Day of March, 2004

JON W. DUDAS
*Acting Director of the United States Patent and Trademark Office*

$\theta$ = FORWARD TILT OF FRAME

UNITED STATES PATENT AND TRADEMARK OFFICE
CERTIFICATE OF CORRECTION

PATENT NO. : 6,637,880 B1
DATED : October 28, 2003
INVENTOR(S) : Tetsuma Yamakaji et al.

It is certified that error appears in the above-identified patent and that said Letters Patent is hereby corrected as shown below:

<u>Column 10,</u>
Line 44, cancel "However, for", and replace with -- For --.

Signed and Sealed this

Eighth Day of June, 2004

JON W. DUDAS
*Acting Director of the United States Patent and Trademark Office*